United States Patent
Inagaki et al.

(10) Patent No.: US 10,464,830 B2
(45) Date of Patent: Nov. 5, 2019

(54) ELECTROLYTIC LIQUID GENERATING DEVICE, LIQUID MODIFYING DEVICE PROVIDED WITH ELECTROLYTIC LIQUID GENERATING DEVICE, AND ELECTRIC APPARATUS USING ELECTROLYTIC LIQUID GENERATED BY MEANS OF ELECTROLYTIC LIQUID GENERATING DEVICE

(71) Applicant: Panasonic Intellectual Property Management Co., Ltd., Osaka (JP)

(72) Inventors: Kenichiro Inagaki, Shiga (JP); Chihiro Ii, Shiga (JP); Shunsuke Mori, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 38 days.

(21) Appl. No.: 15/116,814

(22) PCT Filed: Sep. 7, 2015

(86) PCT No.: PCT/JP2015/004512
§ 371 (c)(1),
(2) Date: Aug. 4, 2016

(87) PCT Pub. No.: WO2016/047055
PCT Pub. Date: Mar. 31, 2016

(65) Prior Publication Data
US 2017/0174539 A1 Jun. 22, 2017

(30) Foreign Application Priority Data
Sep. 26, 2014 (JP) .................................. 2014-196060

(51) Int. Cl.
*C02F 1/467* (2006.01)
*A47L 15/44* (2006.01)
(Continued)

(52) U.S. Cl.
CPC ............ *C02F 1/4672* (2013.01); *A47L 15/44* (2013.01); *C02F 1/46109* (2013.01); *C25B 1/13* (2013.01);
(Continued)

(58) Field of Classification Search
CPC .... A47L 15/44; C02F 1/46109; C02F 1/4672; C02F 2201/46115; D06F 39/00;
(Continued)

(56) References Cited

U.S. PATENT DOCUMENTS

2008/0053840 A1* 3/2008 Arihara ................. C02F 1/4672
205/626
2009/0301865 A1 12/2009 Yoshida et al.
(Continued)

FOREIGN PATENT DOCUMENTS

JP 6-277385 10/1994
JP 2005-336607 12/2005
(Continued)

OTHER PUBLICATIONS

The Extended European Search Report dated Aug. 29, 2017 for the related European Patent Application No. 15844431.5.
(Continued)

*Primary Examiner* — Louis J Rufo
(74) *Attorney, Agent, or Firm* — McDermott Will & Emery LLP

(57) ABSTRACT

Electrolytic liquid generating device (1) includes laminated body (41) in which conductive film (46) is laminated to be interposed between mutually adjacent electrodes (44, 45), and electrolytic part (40) which electrolyzes liquid. Furthermore, electrolytic liquid generating device (1) includes a passage having inflow port (71) in which liquid to be provided to electrolytic part (40) flows and outflow port (72) from which electrolytic liquid generated in electrolytic part
(Continued)

(40) flows out. The passage is formed such that liquid flowing direction (X) crosses laminated direction (Z) of laminated body (41).

17 Claims, 20 Drawing Sheets

(51) Int. Cl.
| | | |
|---|---|---|
| *C25B 11/03* | (2006.01) | |
| *D06F 39/00* | (2006.01) | |
| *C25B 1/13* | (2006.01) | |
| *C25B 9/08* | (2006.01) | |
| *D06F 39/02* | (2006.01) | |
| *C02F 1/461* | (2006.01) | |
| *C25B 11/02* | (2006.01) | |
| *C25B 15/08* | (2006.01) | |
| *C25B 9/06* | (2006.01) | |
| *D06F 35/00* | (2006.01) | |

(52) U.S. Cl.
CPC ............... *C25B 9/06* (2013.01); *C25B 9/08* (2013.01); *C25B 11/02* (2013.01); *C25B 11/03* (2013.01); *C25B 15/08* (2013.01); *D06F 35/001* (2013.01); *D06F 39/00* (2013.01); *D06F 39/02* (2013.01); *C02F 2201/46115* (2013.01)

(58) Field of Classification Search
CPC ........... D06F 39/02; C25B 1/13; C25B 19/00; C25B 19/06; C25B 19/08; C25B 11/02; C25B 11/03; C25B 15/08
See application file for complete search history.

(56) References Cited

U.S. PATENT DOCUMENTS

| | | | |
|---|---|---|---|
| 2010/0006450 | A1* | 1/2010 | Whitehead .......... C02F 1/46109 205/742 |
| 2016/0215402 | A1* | 7/2016 | Takahashi ............... C02F 1/461 |
| 2017/0174539 | A1 | 6/2017 | Inagaki et al. |

FOREIGN PATENT DOCUMENTS

| | | | |
|---|---|---|---|
| JP | 2010-509500 | | 3/2010 |
| JP | 2012-012695 | | 1/2012 |
| JP | 2012012695 | A * | 1/2012 |
| JP | 2014-172029 | A | 9/2014 |
| JP | 2014-172035 | A | 9/2014 |
| JP | 2016-064383 | A | 4/2016 |
| WO | 2007/060807 | | 5/2007 |

OTHER PUBLICATIONS

International Search Report of PCT application No. PCT/JP2015/004512 dated Oct. 6, 2015.

* cited by examiner

LIQUID INFLOW SIDE

LIQUID INFLOW SIDE

LIQUID INFLOW SIDE

LIQUID INFLOW SIDE

LIQUID INFLOW SIDE

LIQUID INFLOW SIDE

LIQUID INFLOW SIDE

LIQUID INFLOW SIDE

ELECTROLYTIC LIQUID GENERATING DEVICE, LIQUID MODIFYING DEVICE PROVIDED WITH ELECTROLYTIC LIQUID GENERATING DEVICE, AND ELECTRIC APPARATUS USING ELECTROLYTIC LIQUID GENERATED BY MEANS OF ELECTROLYTIC LIQUID GENERATING DEVICE

CROSS-REFERENCE TO RELATED APPLICATIONS

This application is a U.S. national stage application of the PCT International Application No. PCT/JP2015/004512 filed on Sep. 7, 2015, which claims the benefit of foreign priority of Japanese patent application 2014-196060 filed on Sep. 26, 2014, the contents all of which are incorporated herein by reference.

TECHNICAL FIELD

The present invention relates to an electrolytic liquid generating device which electrolyzes liquid, a liquid modifying device provided with the electrolytic liquid generating device, and an electric apparatus using electrolytic liquid generated by means of the electrolytic liquid generating device.

BACKGROUND ART

Conventionally, an electrolytic liquid generating device having an electrolytic electrode device provided with a positive electrode, a conductive film, and a negative electrode is known (see PTL 1). In the electrolytic liquid generating device, ozone water (electrolytic liquid) is obtained by generating ozone (electrolytic product) by means of the electrolytic electrode device.

In the electrolytic electrode device described in PTL 1, a groove part provided with a hole formed in the negative electrode and a hole formed in the conductive film is formed. Water is introduced into the groove part and therefore the electrolytic electrode device can electrolyze the introduced water.

However, in the conventional electrolytic electrode device, water (liquid) introduced into the groove part is apt to be retained in the groove part. Thus, ozone (electrolytic product) obtained by electrolyzing water (liquid) introduced into the groove part is also apt to be retained in the groove part. As a result, dissolution efficiency of ozone (electrolytic product) is decreased and therefore ozone concentration (electrolytic product concentration) is also decreased.

CITATION LIST

Patent Literature

PTL 1: Unexamined Japanese Patent Publication No. 2012-012695

SUMMARY OF THE INVENTION

The present invention is provided to solve a conventional problem, and an object of the present invention is to provide an electrolytic liquid generating device capable of increasing electrolytic product concentration of electrolyzed liquid, a liquid modifying device provided with the electrolytic liquid generating device, and an electric apparatus using electrolytic liquid generated by means of the electrolytic liquid generating device.

In order to solve the conventional problem, an electrolytic liquid generating device according to the present invention includes an electrolytic part having a laminated body in which a conductive film is laminated to be interposed between mutually adjacent electrodes, the electrolytic part being configured to electrolyze liquid. Furthermore, the electrolytic liquid generating device includes a passage having an inflow port in which liquid to be provided to the electrolytic part flows and an outflow port from which electrolytic liquid generated in the electrolytic part flows out, the passage being formed such that a liquid flowing direction crosses a laminated direction of the laminated body. Furthermore, in the laminated body, a groove part opened to the passage is formed. At least a part of a boundary surface between the conductive film and the electrodes is exposed to the groove part. Furthermore, a crossing surface crossing an orthogonal surface orthogonal to the liquid flowing direction is formed on at least a part of a side surface of the groove part at a downstream side in the liquid flowing direction among the side surfaces of the groove part. Furthermore, when seen in the laminated direction, the crossing surface is formed such that an edge of the groove part at a bottom surface side in the crossing surface is disposed in a region, which includes a boundary line, defined by an edge of the groove part at an opening side.

With such a configuration, an electrolytic product is suppressed to be retained inside the groove part, and electrolytic product concentration of electrolyzed liquid can be increased.

The electrolytic liquid generating device according to the present invention has the crossing surface, which crosses the orthogonal surface orthogonal to the liquid flowing direction, on at least a part of the side surface of the groove part at the downstream side in the liquid flowing direction among the side surfaces of the groove part. Accordingly, the electrolytic product is suppressed to be retained inside the groove part. Furthermore, the electrolytic product concentration of electrolyzed liquid can be increased.

DESCRIPTION OF EMBODIMENTS

Hereinafter, exemplary embodiments of the present invention are described with reference to drawings. However, the present invention is not limited to the exemplary embodiments.

Furthermore, hereinafter, an ozone water generating device, which generates ozone water (electrolytic liquid) by generating ozone (electrolytic product) and dissolving the ozone into water (liquid), is used as an example of an electrolytic liquid generating device. Here, the ozone water is effective for sterilization and organic matter decomposition, and therefore the ozone water is widely used in a water treatment field, a food field, and a medical field. Furthermore, the ozone water has advantageous effects of non-persistence and generating no subproduct.

Furthermore, hereinafter, an extending direction of a passage is defined as liquid flowing direction (front-rear direction) X, a width direction of the passage is defined as width direction Y, and a direction in which an electrode and a conductive film are laminated is defined as laminated direction (vertical direction) Z.

First Exemplary Embodiment

Figure 1:
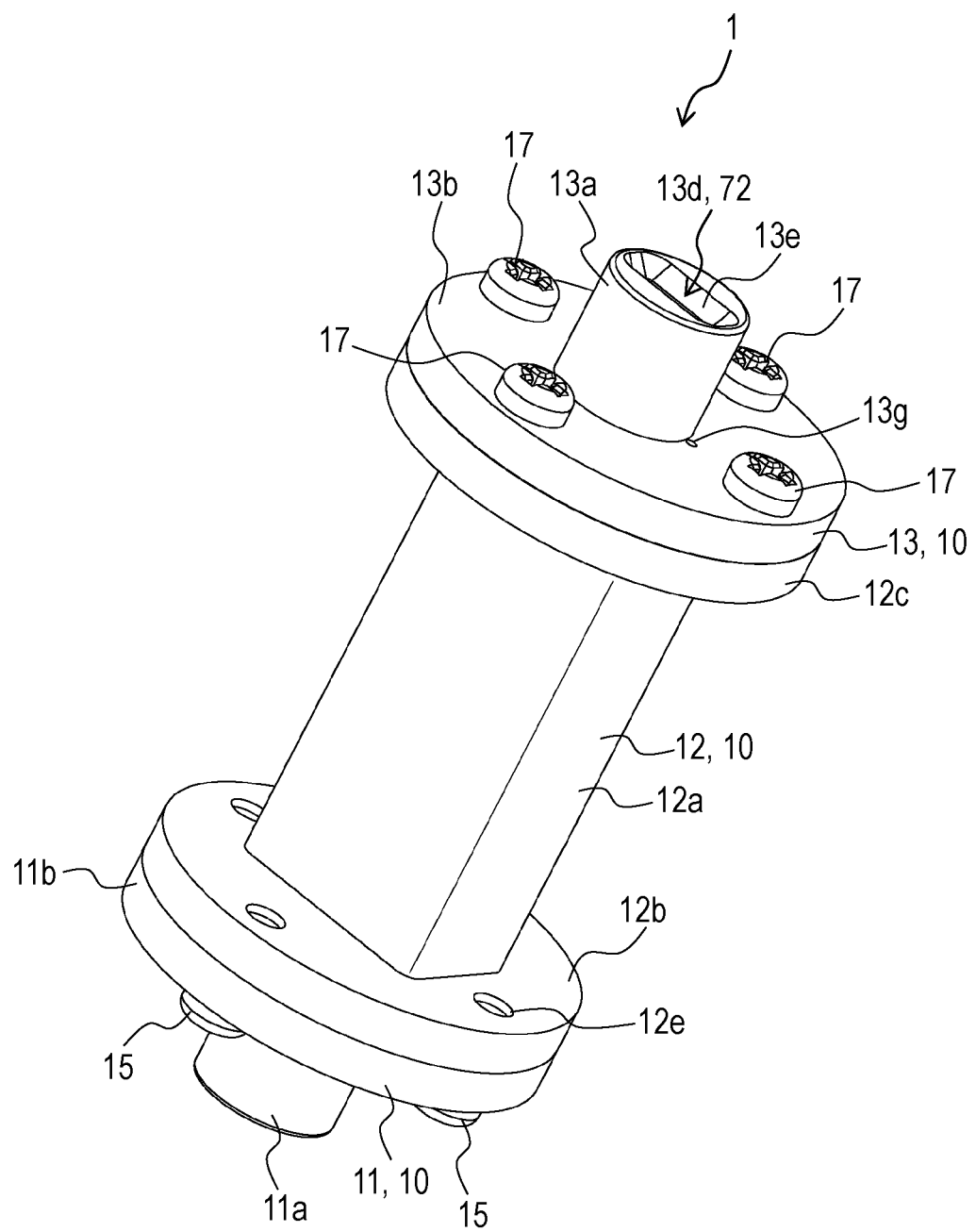
FIG. 1 is a perspective view of an electrolytic liquid generating device according to a first exemplary embodiment of the present invention.

FIG. 1 is a perspective view of electrolytic liquid generating device 1 according to a first exemplary embodiment of the present invention. Inflow side case 11 has cylindrical part 11a and flange part 11b. Body case 12 has cylindrical body part 12a, and flange parts 12b, 12c formed at both ends of cylindrical body part 12a, respectively. Outflow side case 13 has cylindrical part 13a, flange part 13b, outflow port 13d, tapered part 13e, and conductive wire insertion hole 13g. Fastening member 15 is mounted to inflow side case 11. Fastening member 17 is mounted to outflow side case 13.

Figure 2:
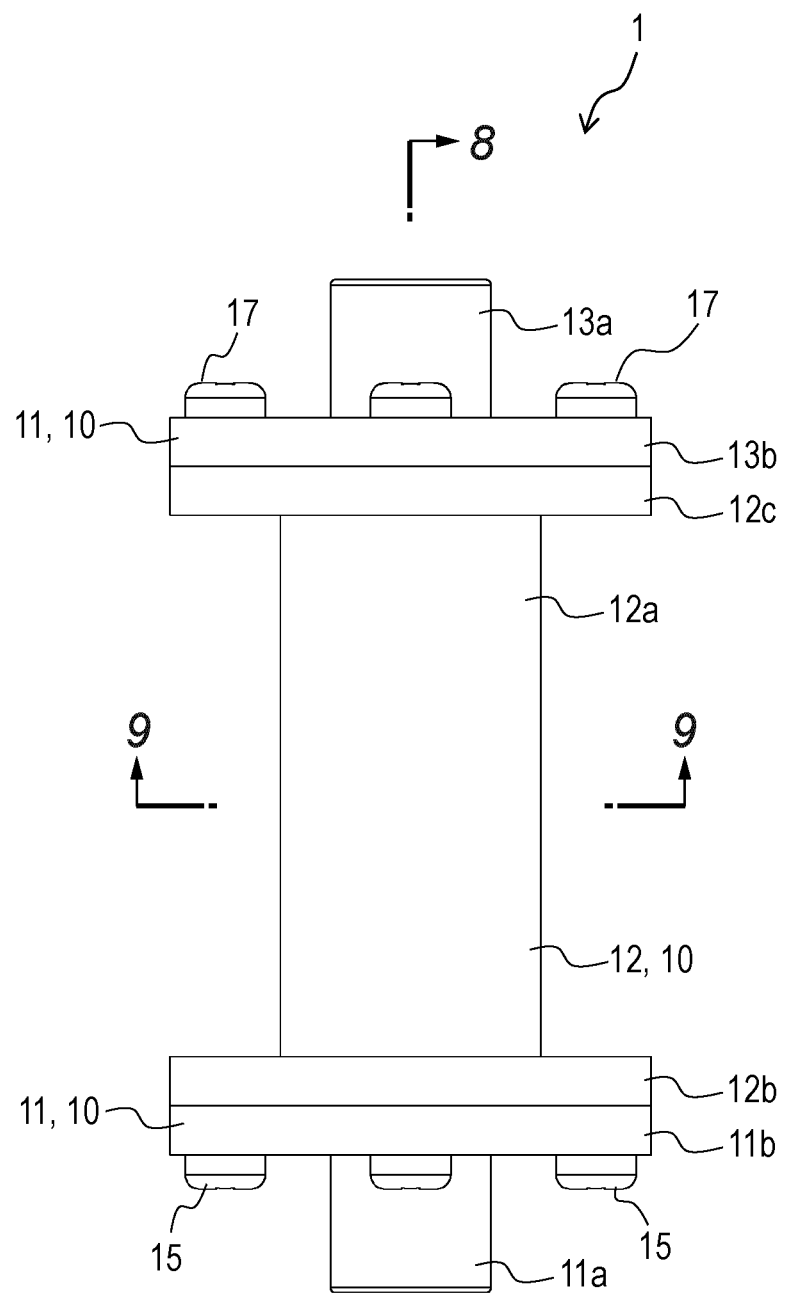
FIG. 2 illustrates the electrolytic liquid generating device, when seen in a laminated direction, according to the first exemplary embodiment of the present invention.

FIG. 2 illustrates electrolytic liquid generating device 1, when seen in the laminated direction, according to the first exemplary embodiment of the present invention. Inflow side case 11 has cylindrical part 11a and flange part 11b. Body case 12 has cylindrical body part 12a, and flange parts 12b, 12c formed at both ends of cylindrical body part 12a, respectively. Outflow side case 13 has cylindrical part 13a and flange part 13b. Fastening member 15 is mounted to inflow side case 11. Fastening member 17 is mounted to flange part 13b.

Figure 4:
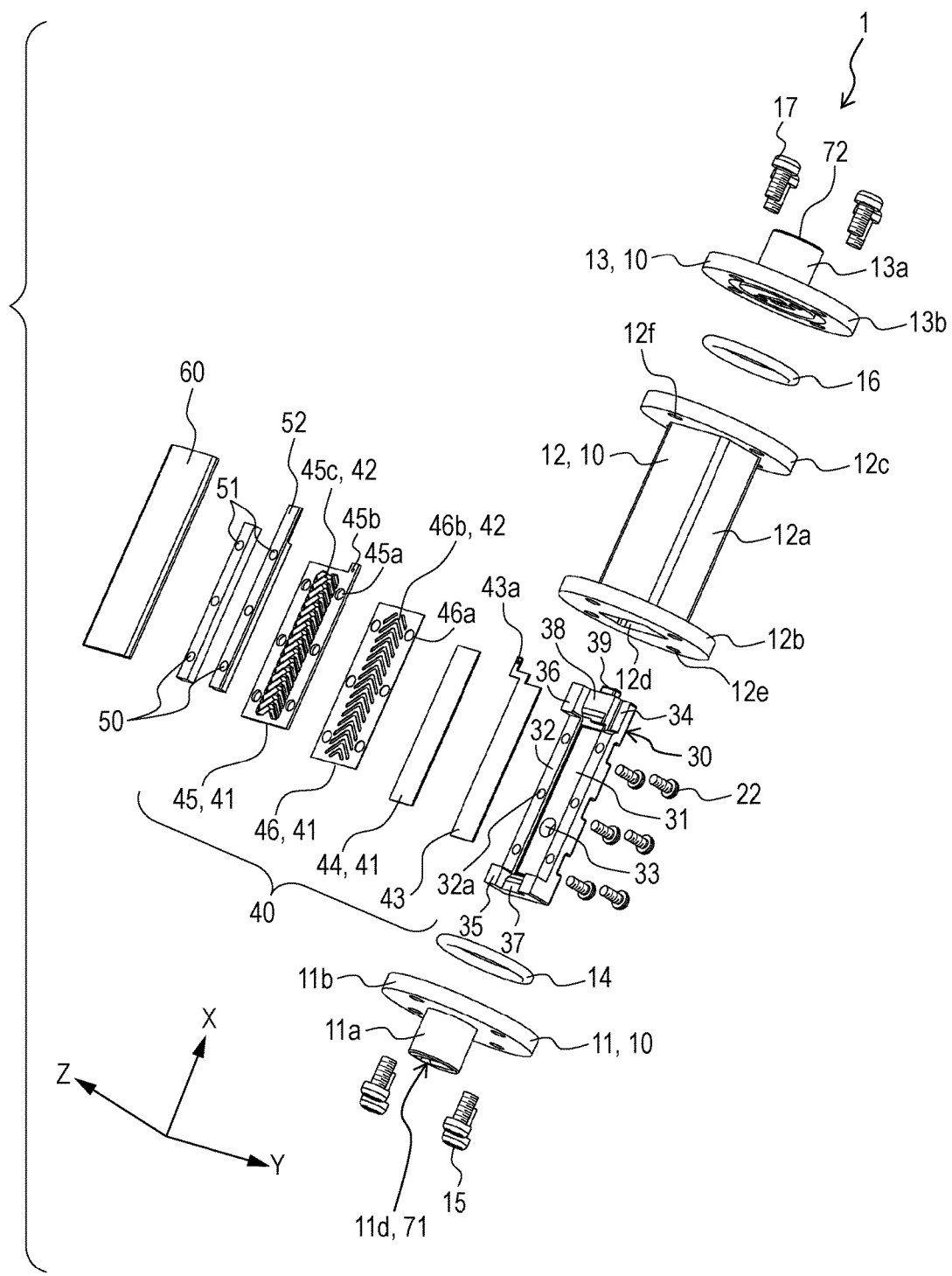
FIG. 4 is an exploded perspective view of the electrolytic liquid generating device according to the first exemplary embodiment of the present invention.

FIG. 4 is an exploded perspective view of electrolytic liquid generating device 1 according to the first exemplary embodiment of the present invention. Ozone water generating device (electrolytic liquid generating device) 1 according to the first exemplary embodiment has laminated body 41 in which conductive film 46 is laminated to be interposed between positive electrode (electrode) 44 and negative electrode (electrode) 45 (between mutually adjacent electrodes) as shown in FIG. 4. Ozone water generating device (electrolytic liquid generating device) 1 has electrolytic part 40 which electrolyzes water (liquid).

Furthermore, ozone water generating device (electrolytic liquid generating device) 1 has inflow port 71 in which water (liquid) to be provided to electrolytic part 40 flows, and outflow port 72 from which electrolytic liquid generated in electrolytic part 40 flows out. Ozone water generating device (electrolytic liquid generating device) 1 has passage 70 formed such that the liquid flowing direction (X direction) of passage 70 crosses the laminated direction (Z direction) of laminated body 41 (see FIG. 15).

Groove part 42 opened to passage 70 (see FIG. 15) is formed in laminated body 41. At least a part of boundary surface 27 (see FIG. 15) between conductive film 46 and the electrode (positive electrode 44 or negative electrode 45) is exposed to groove part 42.

With such a configuration, ozone water generating device (electrolytic liquid generating device) 1 can introduce water (liquid), which is provided from inflow port 71 into passage 70 (see FIG. 15), from passage 70 (see FIG. 15) into groove part 42. Then, water (liquid) introduced into groove part 42 is mainly electrolyzed by causing an electrochemical reaction by electric power provided from power source part 80 (see FIG. 8). With this, ozone water (electrolytic water: electrolytic liquid) into which ozone (electrolytic product) is dissolved is generated. The generated ozone water (electrolytic water: electrolytic liquid) flows out from outflow port 72 to an outside of ozone water generating device (electrolytic liquid generating device) 1 through passage 70 (see FIG. 15).

In this way, ozone water generating device (electrolytic liquid generating device) 1 generates the ozone water (electrolytic water: electrolytic liquid) into which the ozone (electrolytic product) is dissolved by electrolyzing water by causing the electrochemical reaction in water.

Ozone water generating device 1 has housing 10. Electrolytic part 40 is disposed inside housing 10, and passage 70 is formed inside housing 10 (see FIG. 15).

Housing 10 is formed of non-conductive resin such as acryl resin. Housing 10 has inflow side case 11, body case 12, and outflow side case 13.

Outflow side case 11 has cylindrical part 11*a* and flange part 11*b*. Body case 12 has cylindrical body part 12*a* and flange parts 12*b*, 12*c* formed at both ends of cylindrical body part 12*a*, respectively. Insertion hole 12*e* into which fastening member 15 is inserted is formed on flange part 12*b*. Insertion hole 12*f* into which fastening member 17 is inserted is formed on flange part 12*c*. Communication passage 12*d* is formed inside cylindrical body part 12*a*. Outflow side case 13 has cylindrical part 13*a* and flange part 13*b*. O-ring 14 is inserted into a downstream side of flange part 11*b*. O-ring 16 is inserted into an upstream side of flange part 13*b*.

Insertion hole 32*a* into which fastening member 22 is inserted is formed on mounting part 32. Electrolytic part 40 is mounted so as to be interposed between electrode case 30 and electrode pressing member 50 by inserting fastening member 22 into insertion holes 32*a*, 46*a*, 45*a*, 51 communicated with each other. Groove part 31 for housing power feeding body 43 and positive electrode 44 of electrolytic part 40 is formed at a center part of electrode case 30. Insertion hole 33 is formed at a center part of electrode case 30. Notched part 38 is formed at a center part in the width direction and at a downstream side of electrode case 30. Notched part 34, which is deeply notched compared to notched part 38, is formed at another end in the width direction and at the downstream side of electrode case 30. Projection 36 is formed at one end in the width direction and at the downstream side of electrode case 30. Projections 35 are formed at both ends in width direction and at an upstream side of electrode case 30, respectively. Notched part 37 is formed between projections 35. Positioning projection 39 is formed at the upstream side of flange part 13*b*.

An upper end of conductive wire drawing part 45*b* is covered with extension part 52 formed on electrode pressing member 50. Electrode pressing member 50 is covered with passage adjusting member 60.

Figure 8:
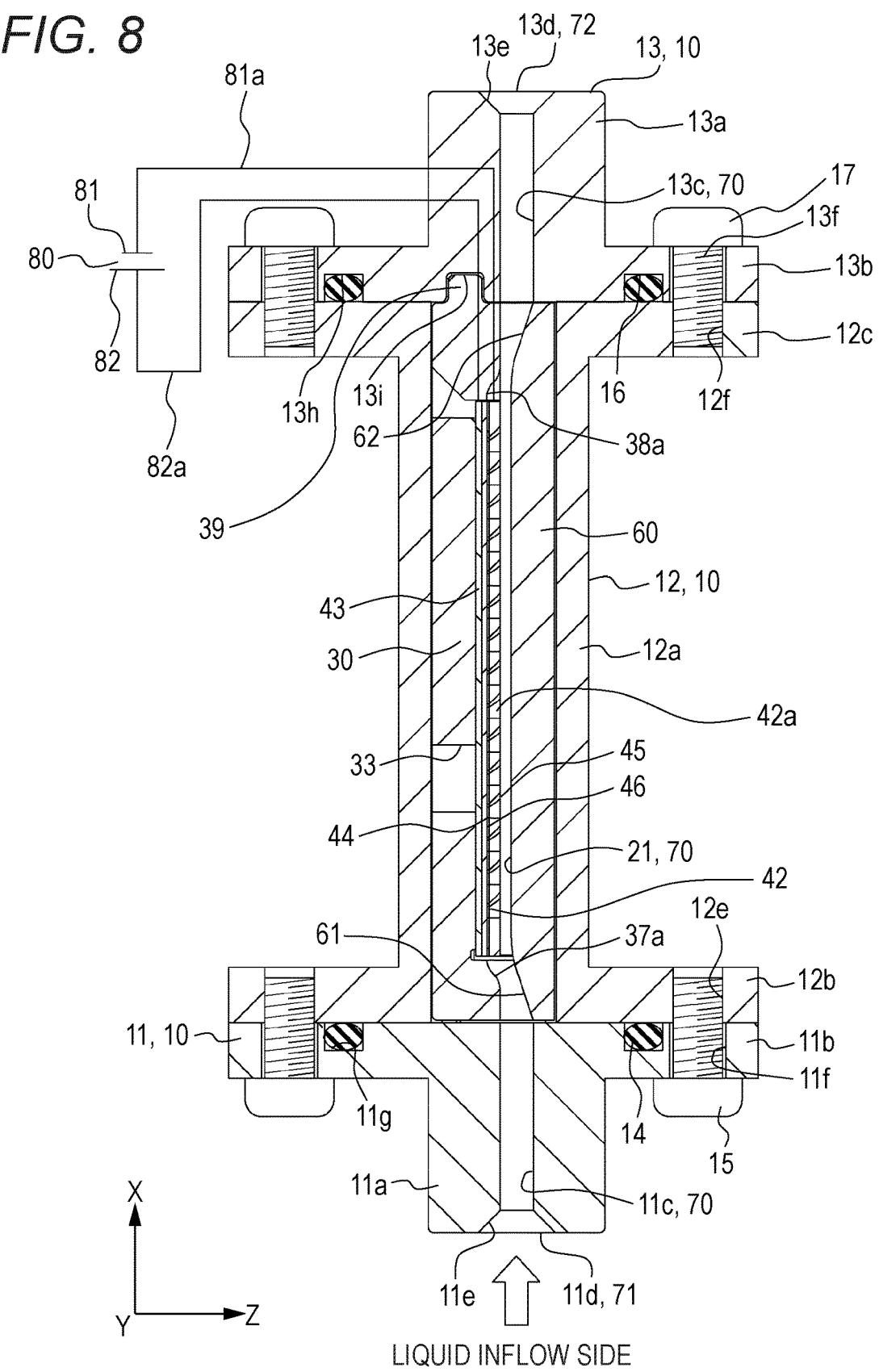
FIG. 8 is a cross-sectional view taken along line 8-8 in FIG. 2.

FIG. 8 is a cross-sectional view taken along line 8-8 in FIG. 2. Inflow side case 11 has cylindrical part 11*a* and flange part 11*b*. Communication passage 11*c* is formed inside cylindrical part 11*a*. Communication passage 11*c* forms a part of passage 70.

Inflow port 11*d* for providing water (liquid) into passage 70 is formed at a distal end side of cylindrical part 11*a* in communication passage 11*c*. Inflow port 11*d* serves as inflow port 71 of passage 70. In the first exemplary embodiment, tapered part 11*e* having a width that increases toward a distal end (upstream side) is formed at an inflow port 11*d* side of communication passage 11*c*.

Insertion hole 11*f* into which fastening member 15 is inserted is formed in flange part 11*b*. Furthermore, groove part 11*g* into which O-ring 14 is inserted is formed at a downstream side of flange part 11*b* (see FIG. 8).

Body case 12 has cylindrical body part 12*a* and flange parts 12*b*, 12*c* formed at both ends of cylindrical body part 12*a*, respectively. Communication passage 12*d* for housing electrolytic electrode device 20 described below is formed inside cylindrical body part 12*a* (see FIGS. 4, 5). Passage 21 forming a part of passage 70 is formed in communication passage 12*d* by disposing electrolytic electrode device 20 in communication passage 12*d* (see FIGS. 4, 5, 8).

Insertion hole 12*e* into which fastening member 15 is inserted is formed in flange part 12*b*. By inserting fastening member 15 into insertion hole 12*e* communicated with insertion hole 11*f*, inflow side case 11 and body case 12 are integrally mounted. At this time, since O-ring 14 is interposed between flange part 11*b* and flange part 12*b*, water is prevented from flowing out to an outside of inflow side case 11 and body case 12 through a gap.

Furthermore, insertion hole 12*f* into which fastening member 17 is inserted is formed in flange part 12*c*.

Outflow side case 13 has cylindrical part 13*a* and flange part 13*b*. Communication passage 13*c* is formed inside cylindrical part 13*a*. Communication passage 13*c* forms a part of passage 70 as well.

Outflow port 13*d* for flowing out water (liquid) in passage 70 is formed at a distal end side (downstream side) of cylindrical part 13*a* in communication passage 13*c*. Outflow port 13*d* serves as outflow port 72 of passage 70. Furthermore, in the first exemplary embodiment, tapered part 13*e*, a width of which becomes larger toward a distal end (downstream side), is formed at an outflow port 13*d* side of communication passage 13*c*.

Insertion hole 13*f* into which fastening member 17 is inserted is formed in flange part 13*b*. Furthermore, positioning groove 13*i* into which positioning projection 39 of electrolytic electrode device 20 described below is inserted, and groove part 13*h* into which O-ring 16 is inserted are formed at an upstream side of flange part 13*b* (see FIG. 8).

Furthermore, by inserting fastening member 17 into insertion hole 13*f* communicated with insertion hole 12*f*, outflow side case 13 and body case 12 are integrally mounted. At this time, since O-ring 16 is interposed between flange part 13*b* and flange part 12*c*, water is prevented from flowing out to an outside of body case 12 and outflow side case 13 through a gap.

In the first exemplary embodiment, electrolytic electrode device 20 into which electrolytic part 40 is installed is formed. Electrolytic electrode device 20 is housed in communication passage 12*d* (see FIGS. 4, 5).

In FIG. 8, insertion hole 33 is formed at a center part of electrode case 30. Tapered parts 37*a*, 38*a* inclined such that each thickness of electrode case 30 becomes thinner toward a center part in the liquid flowing direction (X direction) are formed. Power feeding body 43 is laminated on a lower part of positive electrode 44. In electrolytic part 40, positive electrode 44, conductive film 46, and negative electrode 45 are laminated in this order (see FIG. 5). Passage adjusting member 60 has tapered parts 61, 62 in which each thickness of passage adjusting member 60 at both sides in X direction is thinner than a thickness of passage adjusting member 60 at a center part. Negative electrode 45 is electrically connected to power source part 80 via conductive wire 81a at a negative electrode 81 side. Positive electrode 44 is electrically connected to power source part 80 via conductive wire 82a at a positive electrode 82 side.

Figure 9:
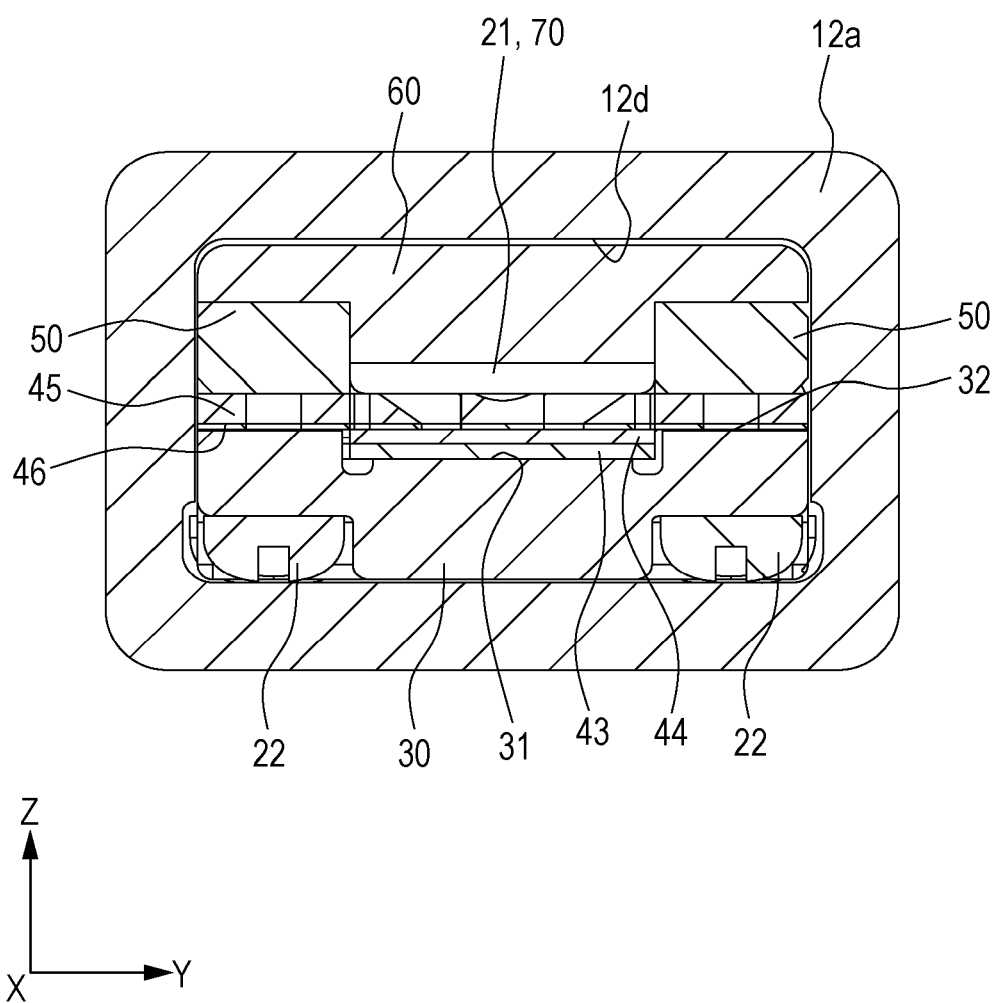
FIG. 9 is a cross-sectional view taken along line 9-9 in FIG. 2.

FIG. 9 is a cross-sectional view taken along line 9-9 in FIG. 2. Communication passage 12d is formed inside cylindrical body part 12a. Passage 21, which forms a part of passage 70, is formed inside cylindrical body part 12a. Groove part 31 for housing power feeding body 43 and positive electrode (electrode) 44 of the electrolytic part is formed at a center part of electrode case 30. Mounting part 32 for disposing both ends of conductive film 46 and negative electrode (electrode) 45 in the width direction is formed at both sides of groove part 31 in the width direction (Y direction). Fastening member 22 is inserted into mounting part 32. By covering electrode pressing member 50 with passage adjusting member 60, electrolytic electrode device (not shown) having passage 21 therein is mounted.

Figure 5:
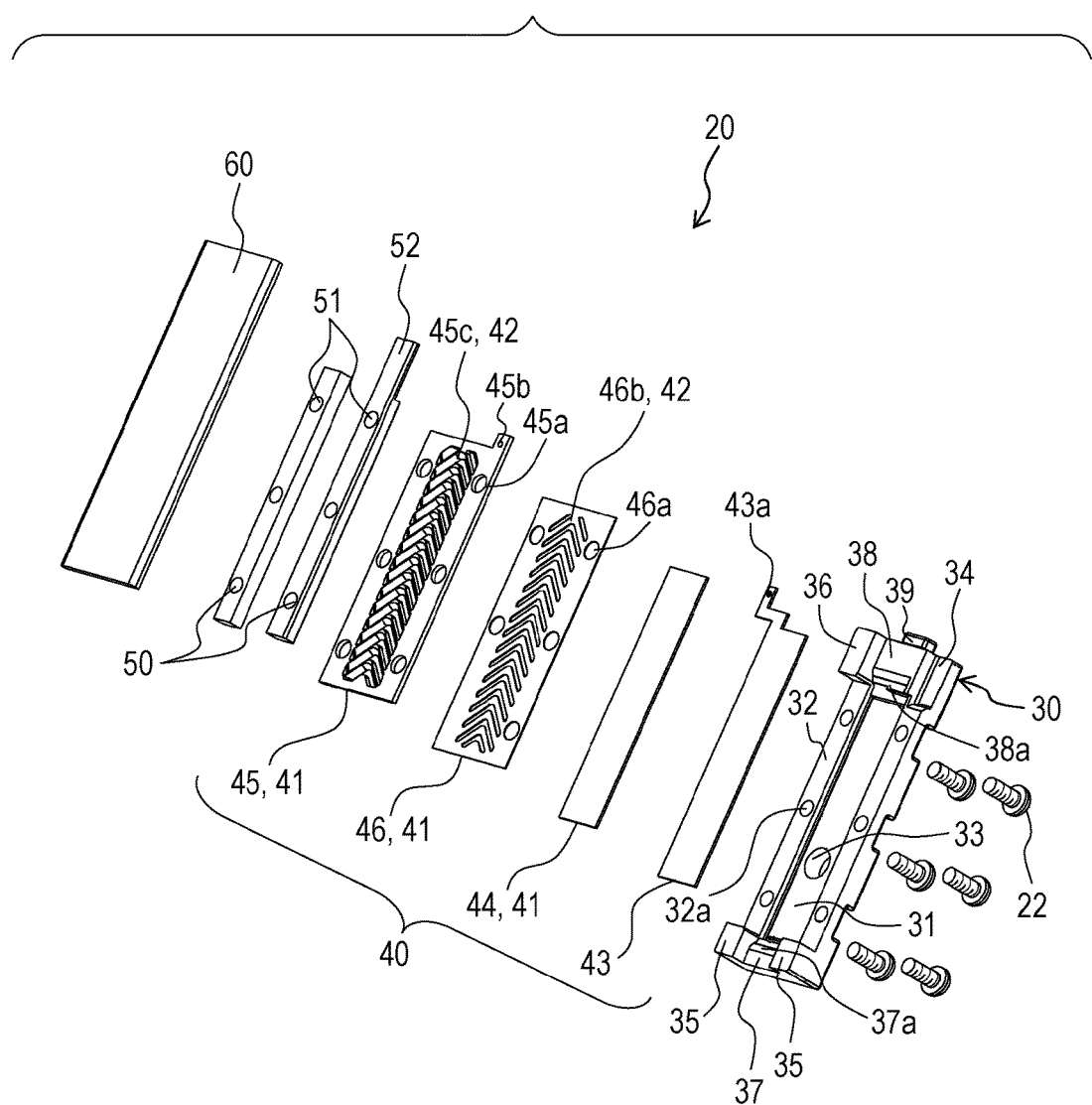
FIG. 5 is an exploded perspective view of an electrolytic electrode device of the electrolytic liquid generating device according to the first exemplary embodiment of the present invention.

FIG. 5 is an exploded perspective view of electrolytic electrode device 20 of electrolytic liquid generating device 1 according to the first exemplary embodiment of the present invention. As shown in FIG. 5, electrolytic electrode device 20 has electrode case 30, electrolytic part 40, electrode pressing member 50, and passage adjusting member 60.

Groove part 31 for housing power feeding body 43 and positive electrode (electrode) 44 of electrolytic part 40 is formed at a center part of electrode case 30. Mounting part 32 for disposing both ends of conductive film 46 and negative electrode (electrode) 45 in the width direction is formed at both sides of groove part 31 in the width direction (Y direction). When electrolytic electrode device 20 is assembled, the both ends of conductive film 46 and negative electrode (electrode) 45 in the width direction are interposed by mounting part 32 and electrode pressing member 50.

Furthermore, insertion hole 33 is formed at a center part of electrode case 30. By inserting a jig not shown into insertion hole 33, electrolytic part 40 can be easily detached from electrode case 30.

Furthermore, projections 35 are formed at both ends in the width direction and at the upstream side of electrode case 30. Notched part 37 is formed between projections 35. Notched part 37 forms a part of passage 21 (see FIG. 9).

On the other hand, projection 36 is formed at one end in the width direction and at the downstream side of electrode case 30. Notched part 38 is formed at a center part in the width direction and at the downstream side of electrode case 30. Notched part 38 forms a part of passage 21 as well (see FIG. 9). Tapered parts 37a, 38a inclined such that each thickness of electrode case 30 becomes thinner toward a center part in the liquid flowing direction (X direction) are formed in notched parts 37, 38, respectively.

Notched part 34, which is deeply notched compared to notched part 38, is formed at another end in the width direction and at the downstream side of electrode case 30. Conductive wire drawing part 45b described below is disposed in notched part 34.

Insertion hole 32a into which fastening member 22 is inserted is formed in mounting part 32. Furthermore, insertion holes 46a, 45a, 51 are formed in conductive film 46, negative electrode (electrode) 45, and electrode pressing member 50, respectively. By laminating conductive film 46, negative electrode (electrode) 45, and electrode pressing member 50 in this order in mounting part 32 and inserting fastening member 22 into insertion holes 32a, 46a, 45a, 51 communicated with each other, electrolytic part 40 is mounted so as to be interposed between electrode case 30 and electrode pressing member 50. Furthermore, by covering electrode pressing member 50 with passage adjusting member 60, electrolytic electrode device 20 having passage 21 therein is assembled (see FIG. 9).

At this time, passage 21 is defined by notched parts 37, 38, a surface of electrolytic part 40 (negative electrode 45), a side surface of electrode pressing member 50, and a lower surface of passage adjusting member 60 (see FIG. 9). In FIG. 5, positioning projection 39 is formed at the upstream side of the flange part. Conductive wire drawing part 43a is formed at one end of power feeding body 43. Negative electrode side hole 45c is formed in negative electrode 45. When negative electrode 45 and conductive film 46 are laminated, negative electrode side hole 45c and conductive film side hole 46b are communicated with each other. An upper part of conductive wire drawing part 45b is covered with extension part 52 formed on one of electrode retaining members 50.

Figure 6:
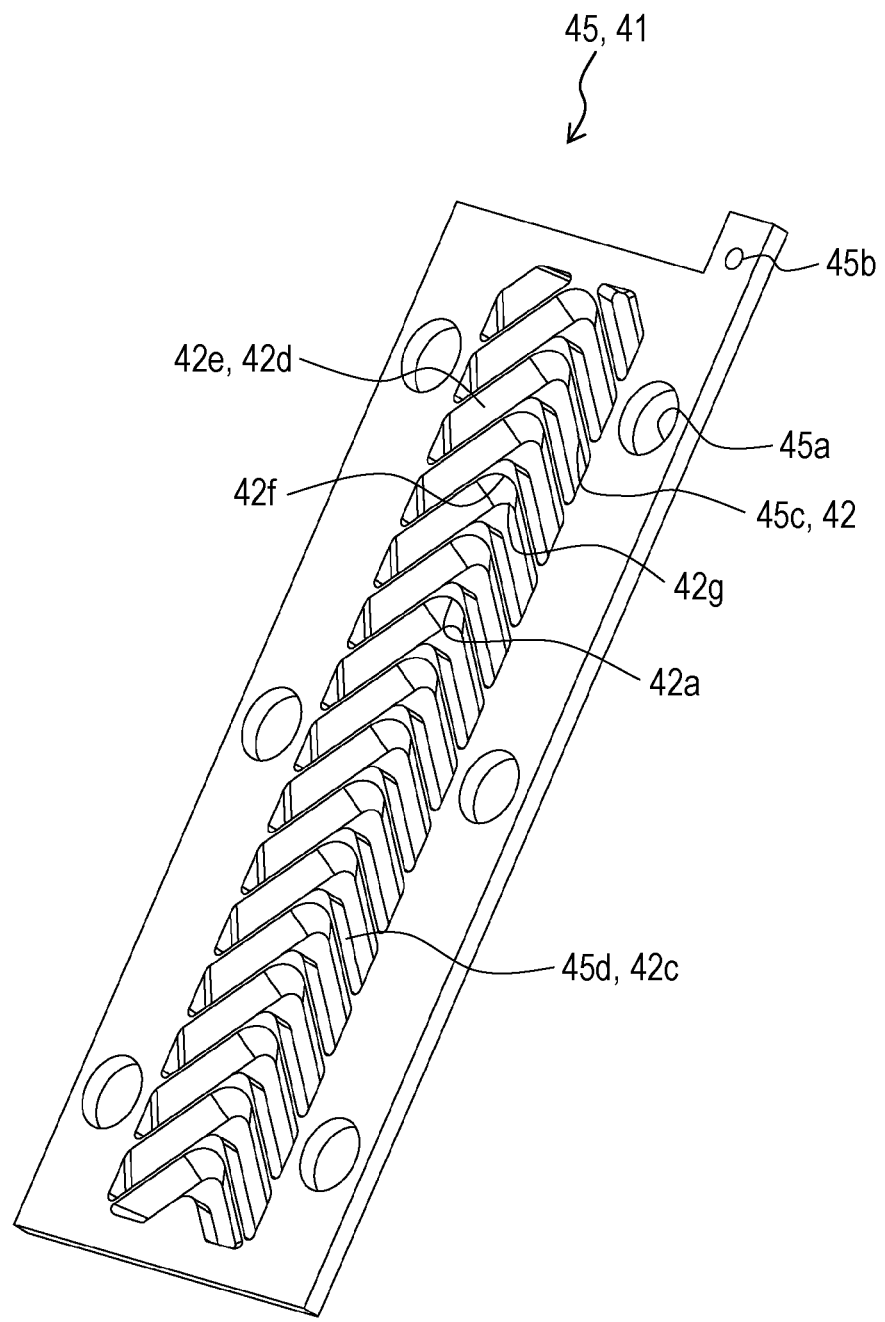
FIG. 6 is a perspective view of a negative electrode of the electrolytic electrode device of the electrolytic liquid generating device according to the first exemplary embodiment of the present invention.

FIG. 6 is a perspective view of negative electrode 45 of electrolytic electrode device 20 of electrolytic liquid generating device 1 according to the first exemplary embodiment of the present invention. Insertion hole 45a, conductive wire drawing part 45b, and negative electrode side hole 45c are formed in negative electrode 45. Side surface 45d of negative electrode side hole 45c is inclined. Groove part 42 has opening 42a. When seen in the laminated direction, edge 42f is formed at an opening 42a side of groove part 42 in crossing surface 42e. Edge 42g at a bottom surface side of groove part 42 in crossing surface 42e is defined by edge 42f at the opening 42a side of the groove part 42.

Figure 7:
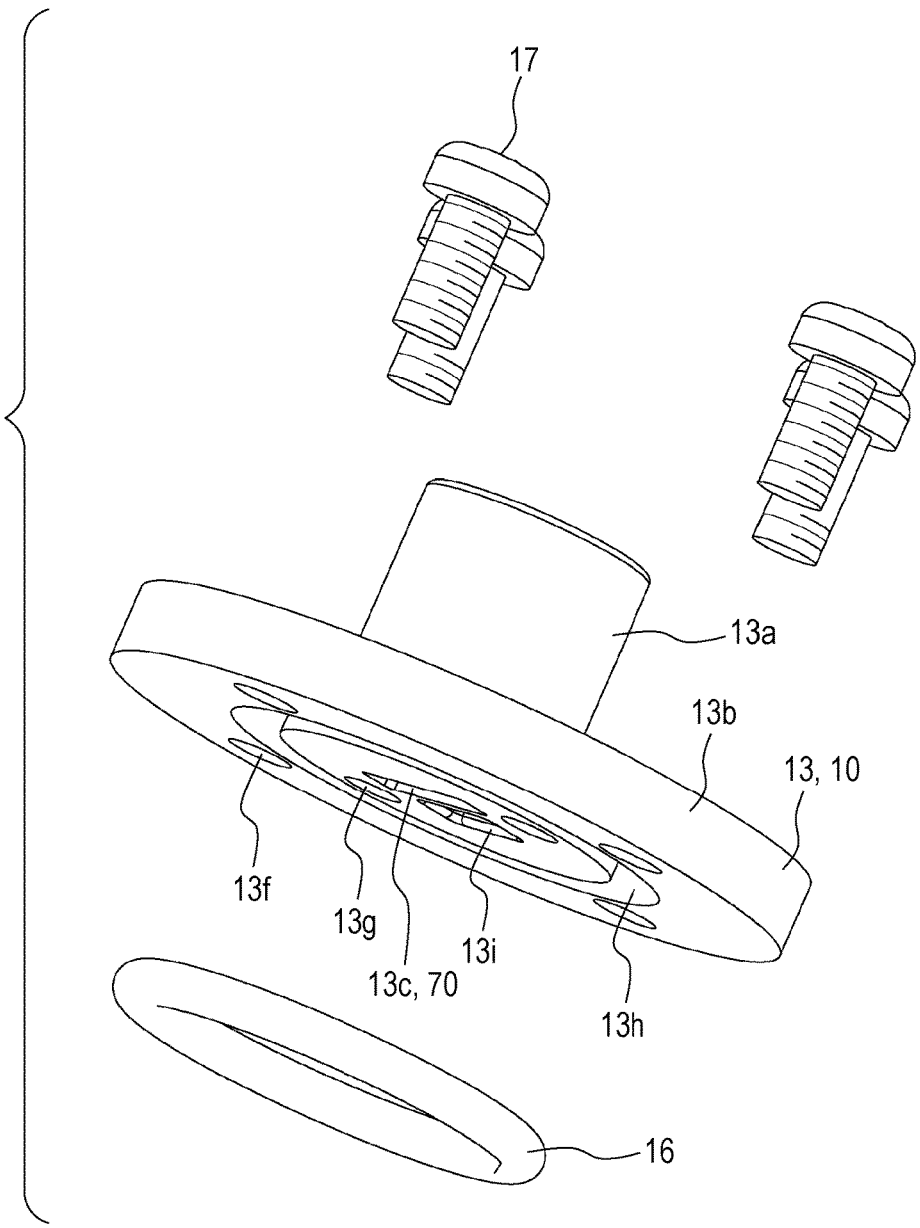
FIG. 7 is an enlarged perspective view of a part of the electrolytic liquid generating device according to the first exemplary embodiment of the present invention.

FIG. 7 is an enlarged perspective view of a part of electrolytic liquid generating device 1 according to the first exemplary embodiment of the present invention. Outflow side case 13 has cylindrical part 13a, flange part 13b, and conductive wire insertion hole 13g. Communication passage 13c is formed inside cylindrical part 13a. Insertion hole 13f into which fastening member 17 is inserted is formed in flange part 13b. Positioning groove 13i for positioning the electrolytic electrode device, and groove part 13h into which O-ring 16 is inserted are formed in flange part 13b.

Furthermore, in the first exemplary embodiment, passage adjusting member 60 has tapered parts 61, 62 in which each thickness of passage adjusting member 60 at both sides in the X direction is thinner than a thickness of passage adjusting member 60 at a center part (see FIG. 8).

Figure 3:
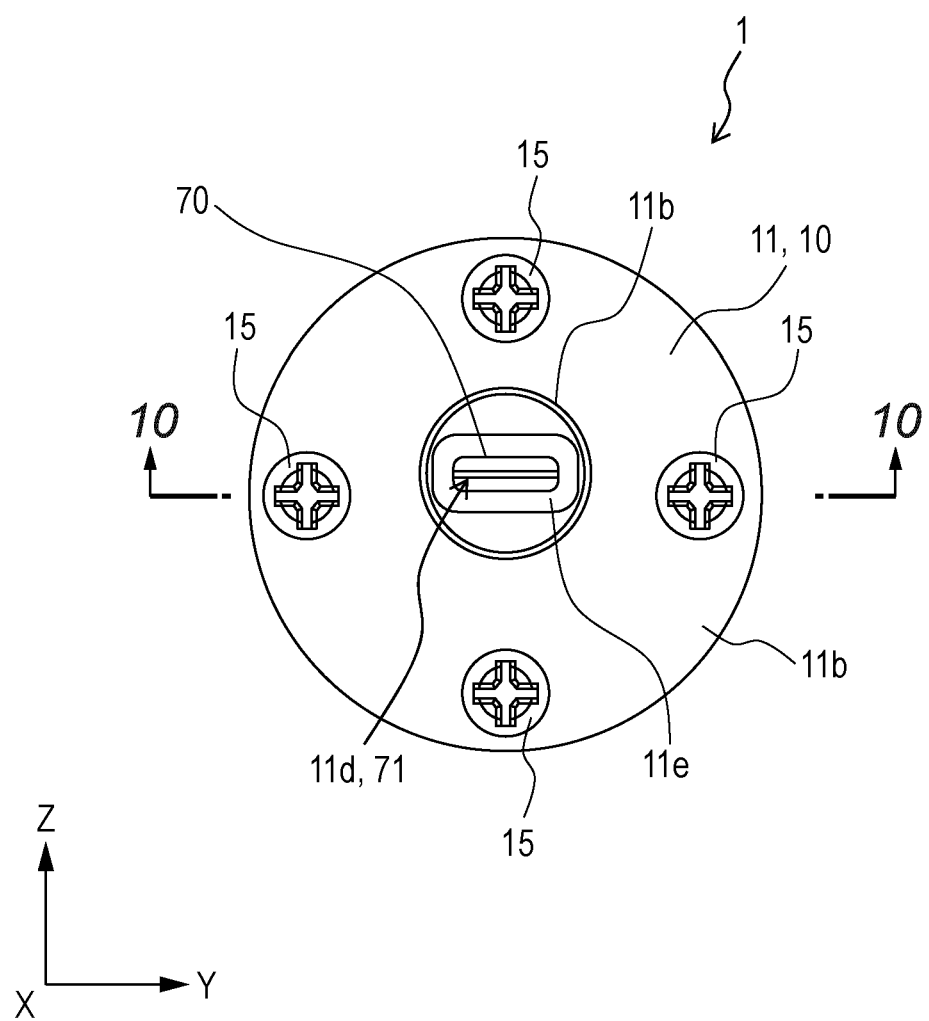
FIG. 3 illustrates the electrolytic liquid generating device, when seen from an inflow side in a liquid flowing direction, according to the first exemplary embodiment of the present invention.

In the first exemplary embodiment, passage 70 is formed in a substantially flat shape between inflow port 71 and outflow port 72. FIG. 3 illustrates electrolytic liquid generating device 1, when seen from an inflow side in the liquid flowing direction, according to the first exemplary embodiment of the present invention. Inflow side case 11 has fastening member 15 and flange part 11b. Tapered part 11e is formed at the inflow port 11d side of communication passage 11c. As shown in FIG. 3, passage 70 is formed in a parallelepiped shape having a long side in Y direction (width direction). Furthermore, in the first exemplary embodiment, as shown in FIG. 8, passage 70 has a region in which negative electrode 45 is disposed with a height lower than other region, and the height of the region in which negative electrode 45 is disposed is to be a substantially constant between one end and another end in X direction. Namely, a cross sectional area of the passage formed above negative electrode 45 is to be substantially constant.

Furthermore, in the first exemplary embodiment, by forming tapered parts 61, 62, a cross sectional area of passage 70 toward the region in which negative electrode 45 is disposed is asymptotically changed (see FIG. 8).

Figure 10:
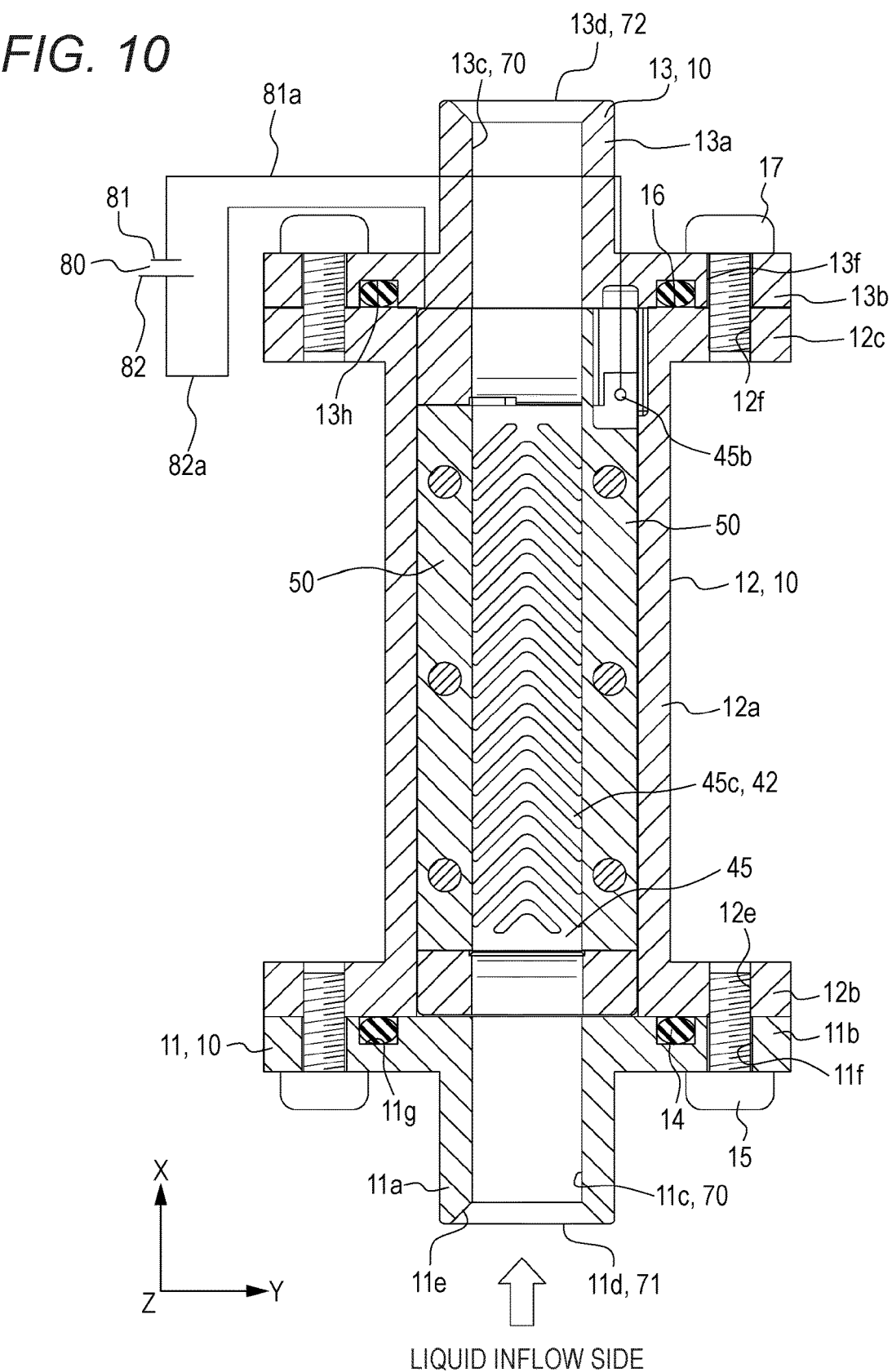
FIG. 10 is a cross-sectional view taken along line 10-10 in FIG. 3.

FIG. 10 is a cross-sectional view taken along line 10-10 in FIG. 3.

Outflow side case 11 has cylindrical part 11a and flange part 11b. Communication passage 11c is formed inside cylindrical part 11a. Communication passage 11c forms a part of passage 70. Inflow port 11d for providing water (liquid) into passage 70 is formed at a distal end side of cylindrical part 11a in communication passage 11c. Inflow port 11d serves as inflow port 71 of passage 70. Tapered part 11e having a width that increases toward a distal end (upstream side) is formed at the inflow port 11d side of communication passage 11c. Insertion hole 11f into which fastening member 15 is inserted is formed in flange part 11b. Furthermore, groove part 11g into which O-ring 14 is inserted is formed at the downstream side of flange part 11b.

Body case 12 has cylindrical body part 12a, and flange parts 12b, 12c formed at both ends of cylindrical body part 12a, respectively. Insertion hole 12e into which fastening member 15 is inserted is formed in flange part 12b. Insertion hole 12f into which fastening member 17 is inserted is formed in flange part 12c.

Outflow side case 13 has cylindrical part 13a and flange part 13b. Communication passage 13c is formed inside cylindrical part 13a. Communication passage 13c forms a part of passage 70 as well. Outflow port 13d for flowing out water (liquid) in passage 70 serves as outflow port 72 of passage 70. Insertion hole 13f into which fastening member 17 is inserted is formed in flange part 13b. Groove part 13h into which O-ring 16 is inserted is formed at the upstream side of flange part 13b.

Conductive wire drawing part 45b and negative electrode side hole 45c are formed in negative electrode 45. An upper part of conductive wire drawing part 45b is pressed by electrode pressing member 50.

Negative electrode 45 is electrically connected to power source part 80 via conductive wire 81a at the negative electrode 81 side. Conductive wire 82a at the positive electrode 82 side is electrically connected to power source part 80.

Figure 19:
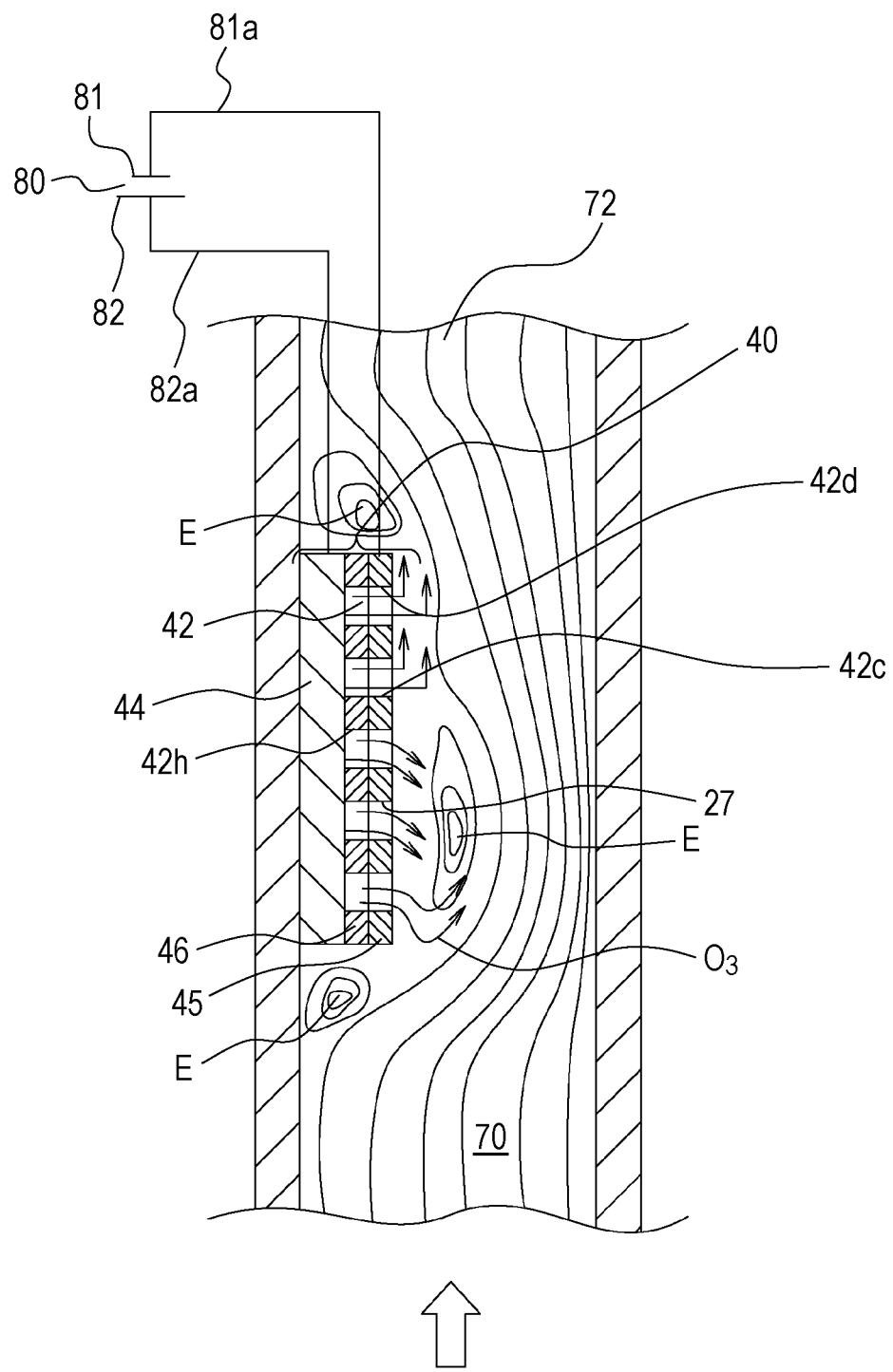
FIG. 19 is a cross-sectional view of the conventional electrolytic liquid generating device, when seen in a width direction.

FIG. 19 is a cross-sectional view of electrolytic liquid generating device 1, when seen in the width direction, according to the first exemplary embodiment of the present invention. As shown in FIG. 19, if electrolytic part 40 is disposed inside passage 70, an amount of flowing water is locally fluctuated in passage 70 due to electrolytic part 40 disposed inside passage 70. Retaining part E in which a flowing speed of the water becomes slow is generated. When retaining part E is generated, an ozone bubble in retaining part E becomes large. Thus, the ozone bubble prevents ozone from dissolving into water. As a result, ozone is discharged as a bubble from water and therefore ozone concentration in water is decreased.

In FIG. 19, groove part 42 to which at least a part of boundary surface 27 between conductive film 46 and the electrode (positive electrode 44 or negative electrode 45) is exposed is formed. Orthogonal surface 42h orthogonal to the liquid flowing direction (X direction) is formed. Negative electrode 45 is electrically connected to power source part 80 via conductive wire 81a at the negative electrode 81 side.

Positive electrode 44 is electrically connected to power source part 80 via conductive wire 82a at the positive electrode 82 side.

However, with a configuration in which a cross sectional area of passage 70 before the region in which negative electrode 45 is disposed is changed asymptotically, turbulence of a water stream in passage 70 can be suppressed compared to a configuration shown in FIG. 19. As a result, generation of the retaining part inside passage 70 is suppressed and therefore the generated ozone can be suppressed to be changed into an ozone bubble. Accordingly, ozone concentration of ozone water flowing out from outflow port 72 can be improved.

Next, a specific configuration of electrolytic part 40 is described.

As shown in FIG. 5, electrolytic part 40 has laminated body 41 provided with positive electrode 44, conductive film 46, and negative electrode 45 laminated in this order. In this way, in the first exemplary embodiment, conductive film 46 is laminated to be interposed between the mutually adjacent electrodes (positive electrode 44 and negative electrode 45) in laminated body 41. Here, in the first exemplary embodiment, for example, power feeding body 43 made of titanium is laminated on a lower side of positive electrode 44. With this, electric power is supplied to positive electrode 44 via power feeding body 43.

Figure 11:
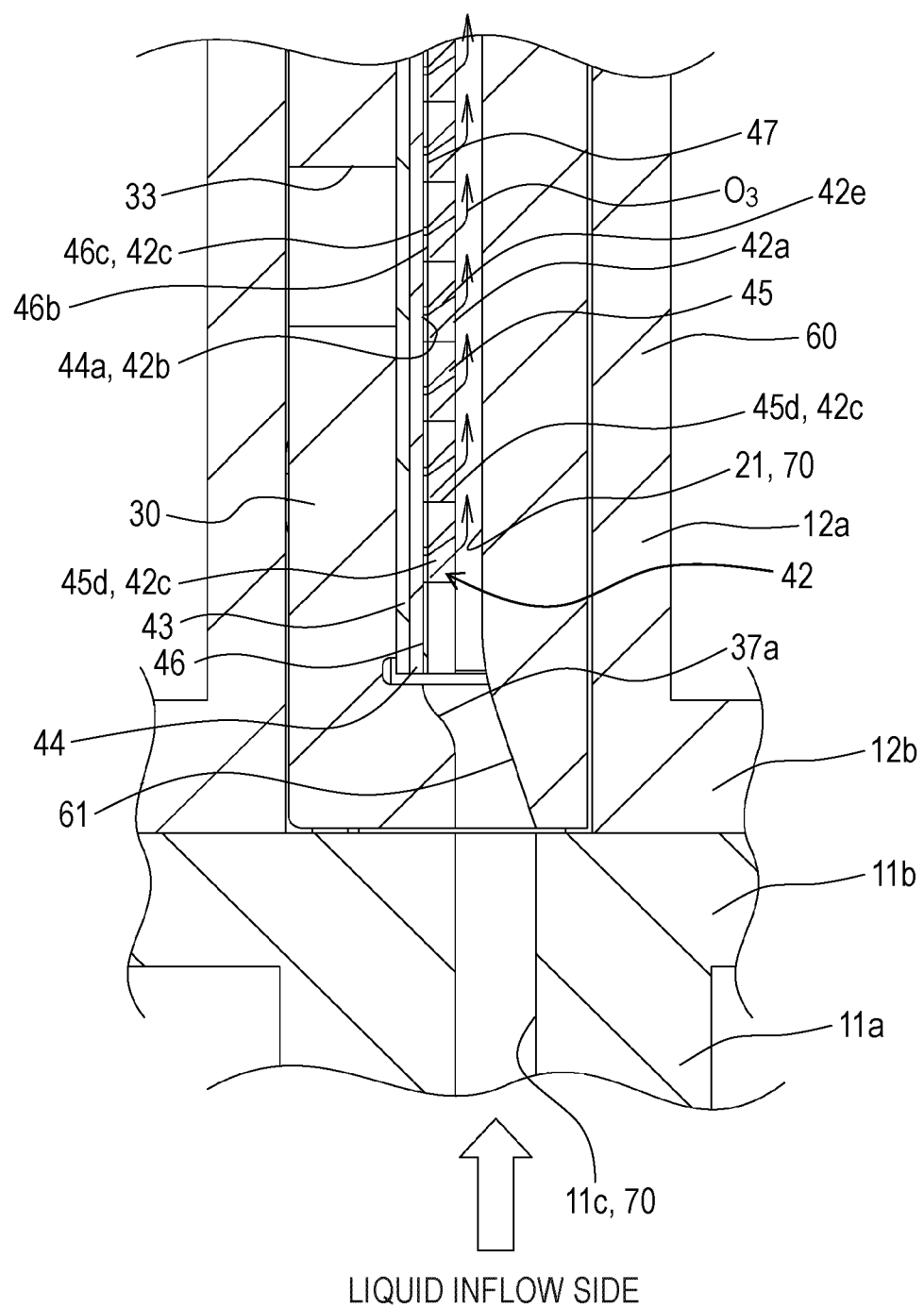
FIG. 11 is a cross-sectional view of the electrolytic liquid generating device illustrating a flow of ozone in a negative electrode side hole of the electrolytic liquid generating device, when seen in a width direction, according to the first exemplary embodiment of the present invention.

Furthermore, in the first exemplary embodiment, groove part 42 having opening 42a opened to passage 70 is formed in laminated body 41 (see FIGS. 4, 11). FIG. 11 is a cross-sectional view of electrolytic liquid generating device 1 illustrating a flow of ozone in negative electrode side hole 45c of electrolytic liquid generating device 1, when seen in the width direction, according to the first exemplary embodiment of the present invention. Groove part 42 is formed such that at least a part of boundary surface 47 between conductive film 46 and negative electrode 45 can be brought into contact with water (liquid) and at least a part of boundary surface 47 between conductive film 46 and positive electrode 44 can also be brought into contact with water (liquid). Here, communication passage 11c is formed inside cylindrical part 11a and flange part 11b. Flange part 12b is formed at an end of cylindrical body part 12a. Insertion hole 33 is formed at a center part of electrode case 30. Tapered part 37a inclined such that a thickness of electrode case 30 becomes thinner is formed. Groove part 42 has opening 42a. Upper surface (surface) 44a of positive electrode 44 serves as bottom surface 42b of groove part 42. Power feeding body 43 is laminated on the lower side of positive electrode 44. By forming tapered part 61, a cross sectional area of the passage before the region in which negative electrode 45 is disposed in passage 70 is changed asymptotically. Passage 21 is formed on a lower surface of passage adjusting member 60.

Specifically, negative electrode side hole 45c is formed in negative electrode 45, and conductive film side hole 46b is formed in conductive film 46 (see FIG. 5). When negative electrode 45 and conductive film 46 are laminated, negative electrode side hole 45c and conductive film side hole 46b are communicated with each other.

Accordingly, side surface 46c of conductive film 46 and side surface 45d of negative electrode 45 form side surface 42c of groove part 42. Upper surface (surface) 44a of positive electrode 44 forms bottom surface 42b of groove part 42. By forming such groove part 42, at least the part of boundary surface (boundary surface between the conductive film and the electrode) 47 between conductive film 46 and negative electrode 45 is exposed to groove part 42. With this, water can be freely brought into contact with boundary surface 47 exposed to groove part 42. Furthermore, since at least the part of boundary surface (boundary surface between the conductive film and the electrode) 47 between conductive film 46 and positive electrode 44 is also exposed to groove part 42, water can be freely brought into contact with boundary surface 47 exposed to groove part 42.

In the first exemplary embodiment, a plurality of groove parts 42 is arranged linearly in X direction (see FIG. 10); however at least one groove part 42 may be disposed.

Furthermore, boundary surface 47 between conductive film 46 and negative electrode 45 according to the first exemplary embodiment corresponds to a boundary line between a side surface of negative electrode 45 and a side surface of conductive film 46. Furthermore, boundary surface 47 between conductive film 46 and positive electrode 44 corresponds to a crossing line between a surface of positive electrode 44 and the side surface of conductive film 46.

Furthermore, size of conductive film 46 and size of negative electrode 45 may be the same, or alternatively may be different from each other. However, it is necessary that both holes (negative electrode side hole 45c and conductive film side hole 46b) are communicated with each other (see FIG. 5). Furthermore, it is necessary that an electrical contact area is sufficiently secured. Thus, taking these into consideration, it is preferable that conductive film 46 and negative electrode 45 have the substantially same projected dimensions (substantially same size to each other, when seen in laminated direction Z).

Furthermore, positive electrode 44 may be formed in the same size as conductive film 46 and negative electrode 45, or alternatively may be formed in a different size. However, it is preferable that positive electrode 44 is formed in a size visible through all groove parts 42 when seen in laminated direction Z.

Electrolytic part 40 performs the electrolytic treatment in which ozone is electrochemically generated on boundary surface 47 between positive electrode 44 and conductive film 46 by receiving ion from conductive film 46 and electric current from power source part 80 (FIGS. 4, 11).

This electrochemical reaction is described as below.

Positive electrode side: $3H_2O \rightarrow O_3 + 6H^+ + 6e^-$
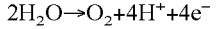
$2H_2O \rightarrow O_2 + 4H^+ + 4e^-$
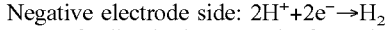
Negative electrode side: $2H^+ + 2e^- \rightarrow H_2$ Power feeding body 43 can be formed of titanium and an opposite side of power feeding body 43 opposite to conductive film 46 is brought into contact with positive electrode 44 (see FIG. 5). Conductive wire drawing part 43a is formed at one end of power feeding body 43. Power feeding body 43 is electrically connected to power source part 80 via conductive wire 82a at the positive electrode 82 side connected to conductive wire drawing part 43a (see FIGS. 4, 8).

Furthermore, conductive wire drawing part 43a is formed in a crank-like protruded shape, and conductive wire 82a is connected to a part of conductive wire drawing part 43a (outside of a region in which passage 21 is formed when seen in laminated direction Z) other than a part in which passage 21 is formed (see FIGS. 4, 8). With such a configuration, conductive wire 82a is disposed without protruding into passage 21.

Positive electrode 44 is formed by forming conductive diamond film onto a conductive substrate, which has a width of 10 mm and a length of 50 mm, made of silicon. The conductive diamond film has a boron-doped conductive property. The conductive diamond film is formed into a thickness of substantially 3 μm and onto the conductive substrate by means of a plasma CVD process.

Figure 12:
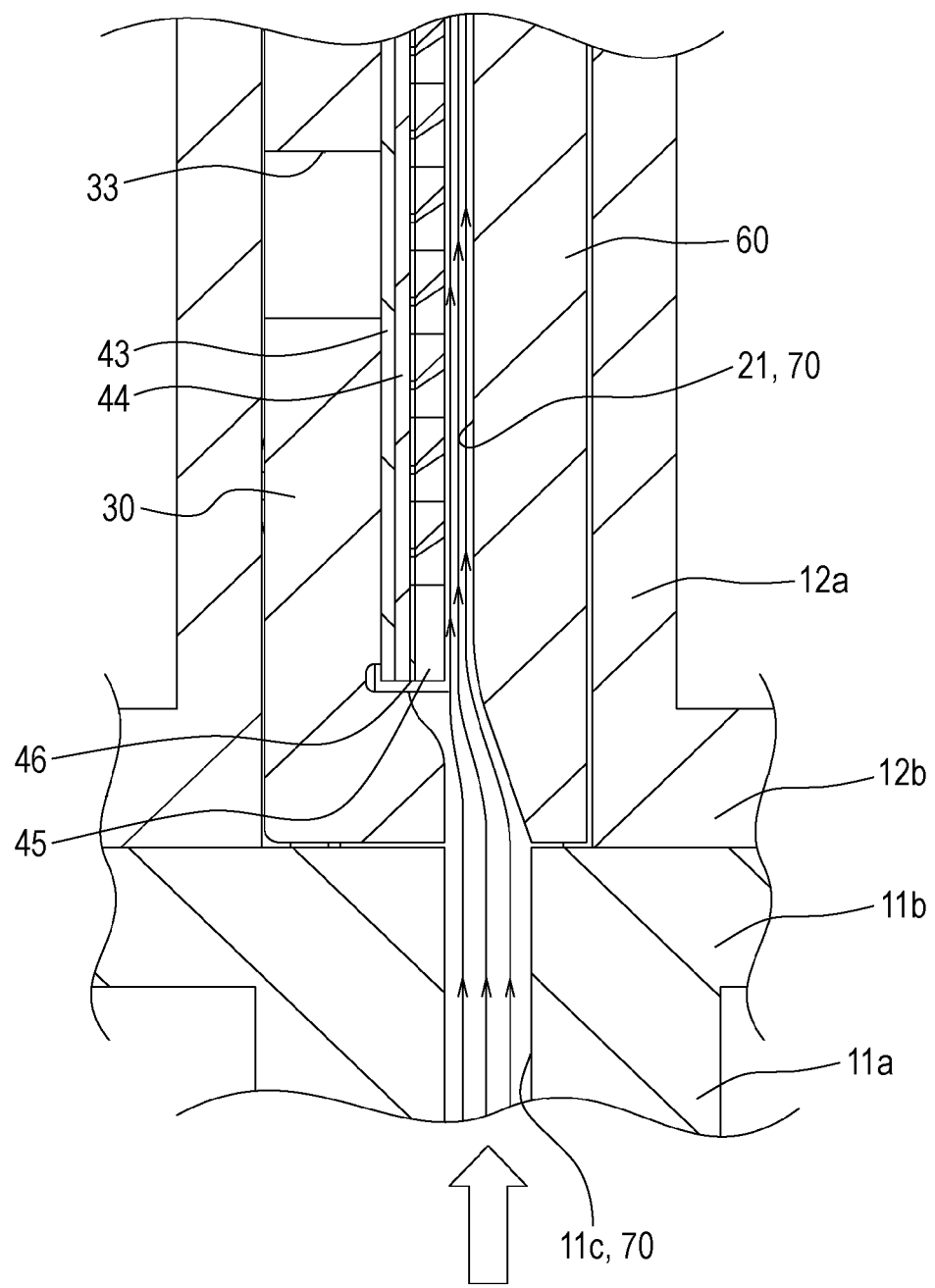
FIG. 12 is a cross-sectional view of the electrolytic liquid generating device illustrating a streamline of liquid in a passage of the electrolytic liquid generating device, when seen in the width direction, according to the first exemplary embodiment of the present invention.

FIG. 12 is a cross-sectional view of electrolytic liquid generating device 1 illustrating a streamline of liquid in passage 21 of electrolytic liquid generating device 1, when seen in the width direction, according to the first exemplary embodiment of the present invention.

Communication passage 11c is formed inside cylindrical part 11a and flange 11b. Flange part 12b is formed at an end of cylindrical body part 12a. Insertion hole 33 is formed at a center part of electrode case 30. Power feeding body 43, positive electrode 44, conductive film 46, and negative electrode 45 are laminated in this order. Passage 21 is formed on a lower surface of passage adjusting member 60. Liquid flows along an arrow illustrated by a solid line.

Furthermore, in the first exemplary embodiment, positive electrode 44 and negative electrode 45 are formed in a plate shape. However, positive electrode 44 and negative electrode 45 may be formed in a film-like shape, a mesh-like, or a line-like shape.

FIG. 4 is an exploded perspective view of electrolytic liquid generating device 1 according to the first exemplary embodiment of the present invention. Conductive film 46 is disposed on positive electrode 44 on which the conductive diamond film is formed. Conductive film 46 is a proton conductive ion exchange film having a thickness of substantially 100 μm to 200 μm. Furthermore, as shown in FIG. 4, a plurality of conductive film side holes 46b penetrating in a thickness direction is formed in conductive film 46.

In the first exemplary embodiment, each conductive film side hole 46b is formed in the same shape. Furthermore, a plurality of conductive film side holes 46b is arranged to form one line. Furthermore, other configuration of the shape and the arrangement of the conductive film side holes 46b may be adopted.

Negative electrode 45 is disposed on conductive film 46. Negative electrode 46 is formed by, for example, a stainless electrode plate having a thickness of substantially 1 mm. As shown in FIG. 4, a plurality of negative electrode side holes 45c penetrating in a thickness direction is formed in negative electrode 45.

Negative electrode side hole 45c has the same opening shape as or a similar opening shape to conductive film side hole 46b. Negative electrode side holes 45c are arranged in the same interval and the same direction as an arrangement of conductive film side holes 46b.

Furthermore, conductive wire drawing part 45b is formed at one end of negative electrode 45. Negative electrode 45 is electrically connected to power source part 80 via conductive wire 81a at the negative electrode 81 side connected to conductive wire drawing part 45b (see FIG. 10). Furthermore, conductive wire 81a is also electrically connected to a part of conductive wire drawing part 45b (outside of a region in which passage 21 is formed when seen in laminated direction Z) other than a part in which passage 21 is formed. With such a configuration, conductive wire 81a can be disposed without protruding into passage 21.

Furthermore, conductive wire drawing part 45b is disposed on notched part 34 in a state in which negative electrode 45 is disposed on electrode case 30. The upper part of conductive wire drawing part 45b is covered with extension part 52 formed on one of electrode pressing members 50.

Furthermore, electrolytic electrode device 20 is assembled in communication passage 12d in a state in which an arranging direction of the plurality of groove parts 42 is roughly matched with front-rear direction X. In this way, by housing electrolytic electrode device 20 in communication passage 12d in a state in which an extending direction of groove part 42 is roughly matched with front-rear direction X, a water flowing direction (liquid flowing direction) of water flowing inside passage 21 (passage 70) is matched with front-rear direction X.

Power source part 80 causes an electric potential difference between positive electrode 44 and negative electrode 45 via conductive film 46. Positive electrode 44 is electrically connected to the positive electrode 82 side of power source part 80 via conductive wire 82a (see FIG. 8). Negative electrode 45 is electrically connected to the negative electrode 81 side of power source part 80 via conductive wire 81a (see FIG. 8). Power source part 80 can be electrically connected to a control part not shown via a wiring not shown, and in a state in which the power source part 80 is connected to the control part, On/Off of power source part 80 can be switched and output of power source part 80 can be changed.

Next, operation and a function of ozone water generating device (electrolytic liquid generating device) 1 with such a configuration is described.

At first, in order to provide water (liquid) into ozone water generating device (electrolytic liquid generating device) 1, water (liquid) is provided from inflow port 71 to passage 70 (see FIG. 8).

Then, a part of water provided to passage 21 flows into groove part 42 and is brought into contact with boundary surface 47 of groove part 42 (see FIG. 11).

In such a state (a state in which electrolytic part 40 is soaked into the provided water), when power source part 80 is turned on and voltage is applied between positive electrode 44 and negative electrode 45 of electrolytic part 40 by power source part 80, the electric potential difference is generated between positive electrode 44 and negative electrode 45 via conductive film 46. In this way, by generating the electric potential difference between positive electrode 44 and negative electrode 45, positive electrode 44, conductive film 46, and negative electrode 45 are energized and water in groove part 42 is electrolyzed, and therefore ozone is generated near boundary surface 47 between conductive film 46 and positive electrode 44.

The voltage to be applied is between several volts and several tens of volts. A generating amount of ozone is larger as the voltage becomes larger (electric current is larger).

Ozone generated near boundary surface 47 between conductive film 46 and positive electrode 44 is dissolved into water while being carried to a downstream side of passage 70 along a flow of water. In this way, by dissolving ozone into water, ozone dissolved water (ozone water) is generated.

Figure 18:
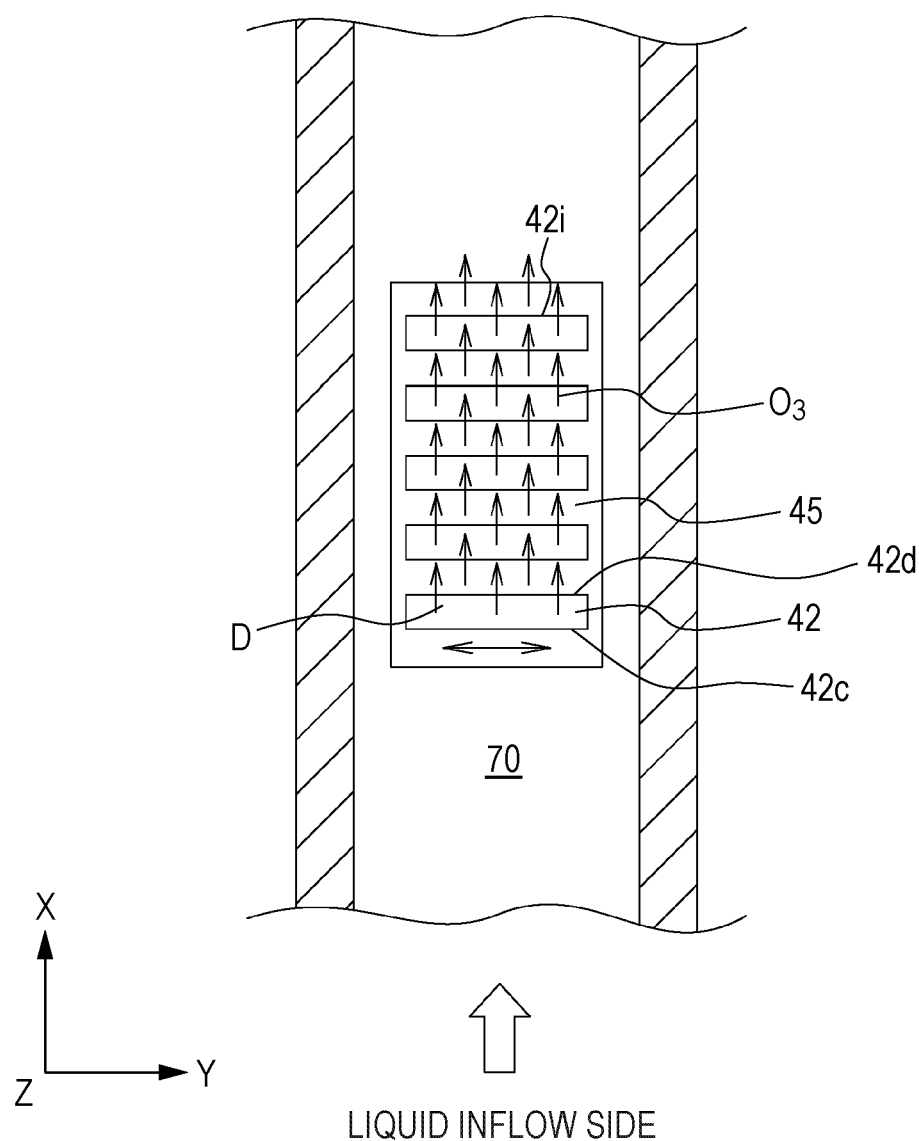
FIG. 18 is a cross-sectional view of a conventional electrolytic liquid generating device, when seen in a laminated direction.

FIG. 18 is a cross-sectional view of a conventional electrolytic liquid generating device, when seen in the laminated direction. As shown in FIGS. 18 and 19, groove part 42 is formed in a substantially parallelepiped shape. If side surface 42d at the downstream side in the liquid flowing direction (X direction) among side surfaces 42c of groove part 42 is formed as orthogonal surface 42h orthogonal to the liquid flowing direction (X direction), it is difficult to return water in groove part 42 into passage 21 (passage 70). Furthermore, retaining part D is generated near orthogonal surface 42h in groove part 42, and water may be retained in retaining part D. In this way, when water is retained inside groove part 42, an ozone bubble becomes larger in retaining part D, and therefore the ozone is prevented from dissolving into water. As a result, dissolving efficiency of ozone (electrolytic product) is decreased and ozone concentration (electrolytic product concentration) is decreased.

In FIG. 18, groove part 42 is formed in negative electrode 45. A line depicted by edge 42f in FIG. 6 crosses line 42i. In FIG. 18, a groove is formed along directions (Y, Z directions) orthogonal to a flowing direction, and therefore a retaining part is apt to be generated.

Thus, the first exemplary embodiment makes it possible to suppress retaining of the electrolytic product in the groove part and to increase the electrolytic product concentration of electrolyzed liquid.

Specifically, crossing surface 42e (see FIG. 6) crossing orthogonal surface 42h (see FIG. 19) orthogonal to the liquid flowing direction (X direction) is formed on at least a part of side surface 42d at the downstream side in the liquid flowing direction (X direction) among side surfaces 42c of groove part 42.

In the first exemplary embodiment, groove part 42 is formed such that both ends in the Y direction of groove part 42, which is extended in an elongated manner in Y direction (width direction), are bent toward the upstream side. Namely, negative electrode side hole 45c (see FIG. 4), which is formed in the negative electrode so as to penetrate in the laminated direction (Z direction), is formed in a V-shape such that its bending part is disposed at the downstream side. With such a configuration, at least a part of negative electrode side hole 45c in a longitudinal direction is disposed to extend in a direction crossing the liquid flowing direction (X direction) (see FIG. 10).

Furthermore, by forming conductive film side hole 46b (see FIG. 4), which is formed in conductive film 46 so as to penetrate in the laminated direction (Z direction), is also in a V-shape such that its bending part is disposed at the downstream side and by communicating negative electrode side hole 45c and conductive film side hole 46b with each other, groove part 42 is formed in a V-shape.

With such a configuration, when seen in the laminated direction (Z direction), the line depicted by edge 42f (see FIG. 6) at the opening 42a side of groove part 42 in crossing surface 42e (see FIG. 6) is extended in a direction crossing line 42i (see FIG. 18) depicted by orthogonal surface 42h (FIG. 19).

Conductive film 46 has conductive film side hole 46b (see FIG. 4) formed so as to penetrate in the laminated direction (Z direction) and communicate with negative electrode hole 45c.

A center part in Y direction of passage 21 (passage 70) defines first region R2 in which flowing speed is high. Both sides in Y direction (both sides in the width direction) of first region R2 define second region R3 in which the flowing speed is low compared to that in first region R2 (see FIG. 14).

Figure 14:
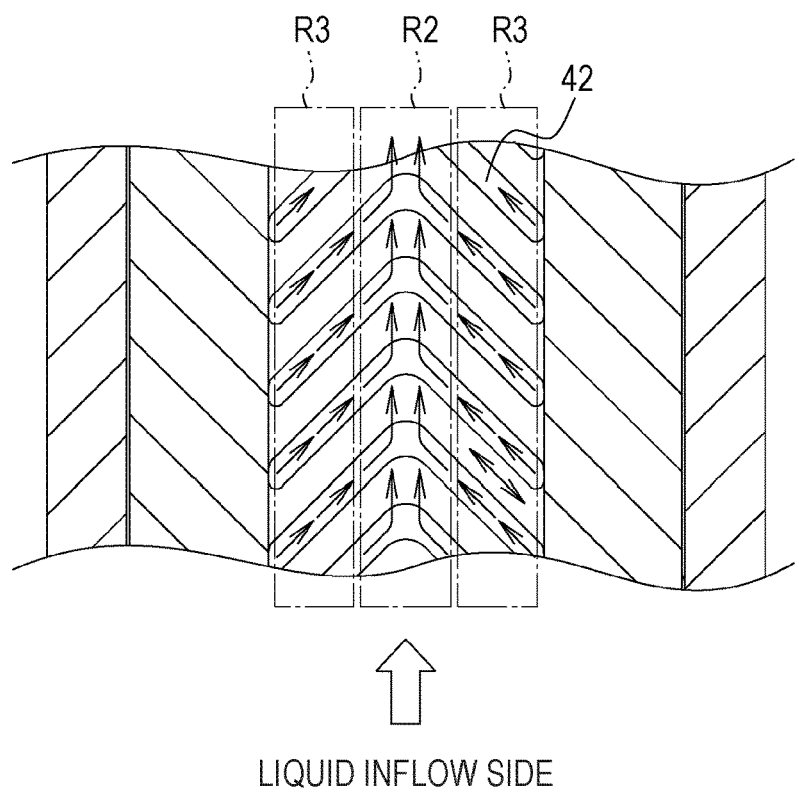
FIG. 14 is a cross-sectional view of the electrolytic liquid generating device illustrating the flow of ozone in the negative electrode side hole of the groove part of the electrode liquid generating device, when seen in the laminated direction, according to the first exemplary embodiment of the present invention.

Accordingly, groove part 42 is disposed such that first region R2 in which the flowing speed is high is disposed at the downstream side of second region R3 in which the flowing speed is low compared to that in first region R2 (see FIG. 14).

Furthermore, in the first exemplary embodiment, crossing surface 42e is formed in negative electrode side hole 45c (see FIG. 6).

Crossing surface 42e formed in negative electrode side hole 45c is inclined upward from a conductive film 46 side (bottom surface 42b (see FIG. 11) side of groove part 42) toward an opposite side opposite to the conductive film 46 side (opening 42a side of groove part 42) in a state in which laminated body 41 is disposed such that the opening 42a side of groove part 42 is to be an upper side.

Figure 13:
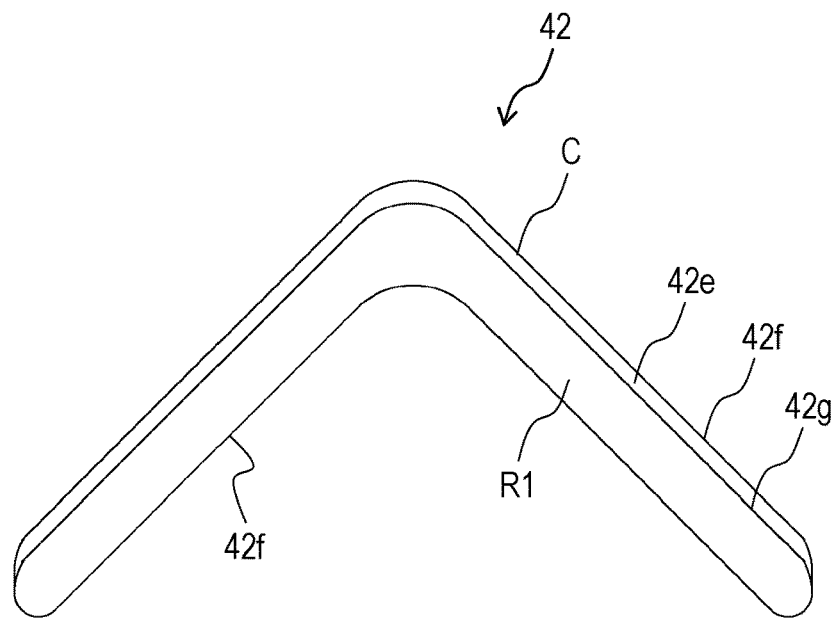
FIG. 13 is a schematic view of the negative electrode side hole of the electrolytic liquid generating device, when seen from an opening side of a groove part, according to the first exemplary embodiment of the present invention.

FIG. 13 is a schematic view of negative electrode side hole 45c of electrolytic liquid generating device 1, when seen from the opening 42a side of groove part 42, according to the first exemplary embodiment of the present invention. Accordingly, when groove part 42 is seen from above in a state in which laminated body 41 (see FIG. 5) is disposed such that the opening 42a (see FIG. 11) side of groove part 42 is to be the upper side, as shown in FIG. 13, edge 42g at the bottom surface 42b (see FIG. 11) side of groove part 42 in crossing surface 42e is disposed within region R1, which includes boundary line C, defined by edge 42f at the opening 42a (see FIG. 11) side of groove part 42.

In other words, edge 42g at the bottom surface 42b (see FIG. 11) side of groove part 42 in crossing surface 42e is disposed in region R1 which is an inside region of boundary line C and includes boundary line C defined by edge 42f at the opening 42a (see FIG. 11) of groove part 42.

Here, boundary line C is a closed curve line depicted by edge 42f at the opening 42a (see FIG. 11) side of groove part 42.

By forming groove part 42 as described above, generated ozone is moved along an incline of negative electrode side hole 45c (see FIG. 4), and therefore ozone is suppressed to be retained and changed into a bubble. As a result, the ozone concentration of electrolyzed water can be increased.

Here, crossing surface 42e crosses the liquid flowing direction when seen from above; however crossing surface 42e may be orthogonal to bottom surface 42b of groove part 42.

Furthermore, crossing surface 42e may formed by inclining an edge at the opening 42a side of orthogonal surface 42h (see FIG. 19) toward the downstream side.

FIG. 14 is a cross-sectional view of electrolytic liquid generating device 1 illustrating the flow of ozone in negative electrode side hole 45c of groove part 42 of electrolytic liquid generating device 1, when seen in the laminated direction, according to the first exemplary embodiment of the present invention.

In FIG. 14, negative electrode side hole 45c is formed such that first region R2 in which the flowing speed is high is disposed at the downstream side of second region R3 in which the flowing speed is low compared to that in first region R2. With this, generated ozone can be moved along the incline of negative electrode side hole 45c (see solid line arrows in FIG. 14). With this, ozone is suppressed to be retained and changed into a bubble. As a result, the ozone concentration of electrolyzed can be increased.

Figure 15:
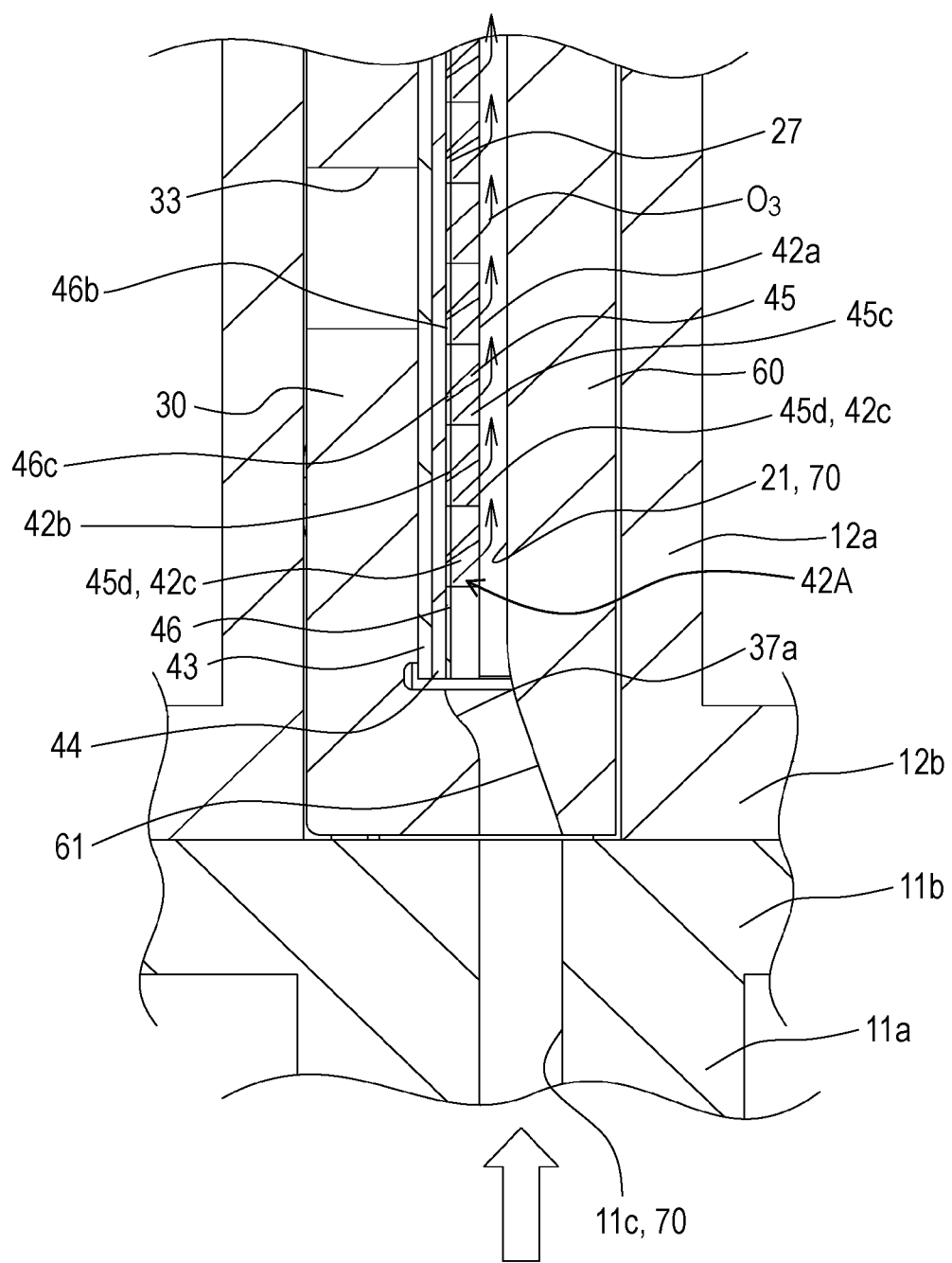
FIG. 15 is a cross-sectional view of the electrolytic liquid generating device illustrating the flow of ozone in the negative electrode side hole of the groove part of the electrode liquid generating device, when seen in the width direction, according to the first exemplary embodiment of the present invention.

Here, in the first exemplary embodiment, as shown in FIG. 11, side surface 46c of conductive film side hole 46b is formed to be orthogonal to bottom surface 42b of groove part 42. However, as shown in FIG. 15, groove part 42A may be adopted in which side surface 46c of conductive film side hole 46b is inclined similar to side surface 45d of negative electrode side hole 45c. FIG. 15 is a cross-sectional view of electrolytic liquid generating device 1 illustrating the flow of ozone in negative electrode side hole 45c of groove part 42 of electrode liquid generating device 1, when seen in the width direction, according to the first exemplary embodiment of the present invention. With such a configuration, water at a bottom surface 42b side can be smoothly returned into passage 21. Here, in FIG. 15, communication passage 11c is formed inside cylindrical part 11a and flange part 11b. Flange part 12b is formed at an end of cylindrical body part 12a. Passage 21 forming a part of passage 70 is formed in electrolytic electrode device 20. Boundary surface 27 is formed as a boundary surface between conductive film 46 and the electrode (positive electrode 44 or negative electrode 45). Power feeding body 43 is housed in electrode case 30. Opening 42a is opened to passage 70. Inclined tapered part 37a is formed such that a thickness of electrode case 30 becomes thin. By forming tapered part 61, the cross sectional area of the passage the region in which the negative electrode 45 is disposed in passage 70 is asymptotically changed.

Figure 16:
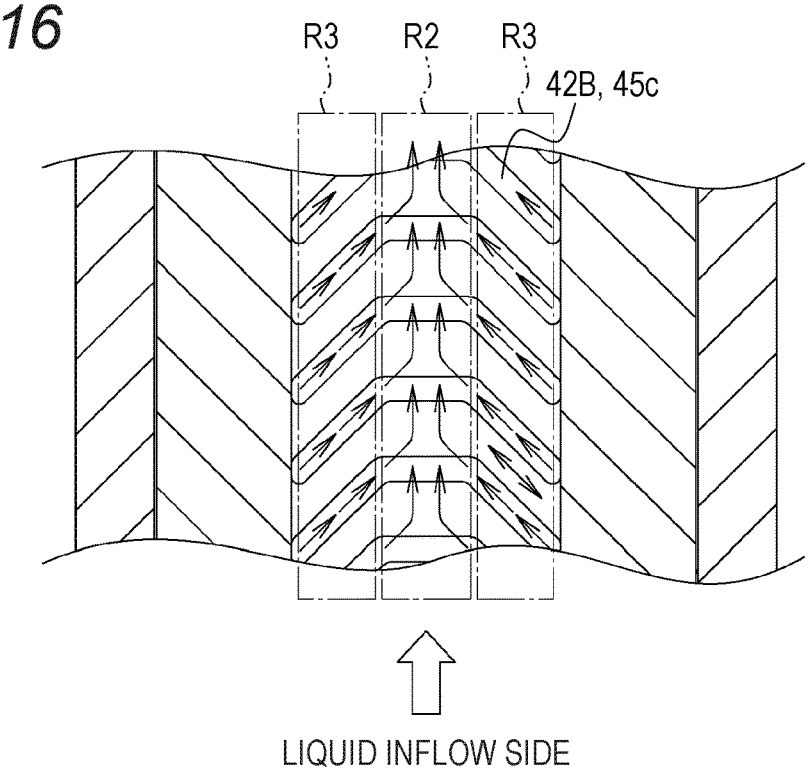
FIG. 16 is a cross-sectional view of the electrolytic liquid generating device illustrating the flow of ozone in the negative electrode side hole of the groove part of the electrode liquid generating device, when seen in the width direction, according to the first exemplary embodiment of the present invention.

Furthermore, groove part 42B shown in FIG. 16 may be adopted. FIG. 16 is a cross-sectional view of electrolytic liquid generating device 1 illustrating the flow of ozone in negative electrode side hole 45c of groove part 42 of electrode liquid generating device 1, when seen in the width direction, according to the first exemplary embodiment of the present invention.

In FIG. 16, negative electrode side hole 45c is formed in a shape in which both ends in the width direction of negative electrode side hole 45c are bent.

Furthermore, in FIG. 16, negative electrode side hole 45c is also formed such that first region R2 in which the flowing speed of liquid in passage 21 is large is disposed at the downstream side of second region R3 in which the flowing speed is low compared to that in first region R2.

With such a configuration, a part of negative electrode side hole 45c in the longitudinal direction is also disposed to be inclined to the liquid flowing direction (X direction). Accordingly, generated ozone can be moved along the incline of negative electrode side hole 45c (see solid line arrows in FIG. 16). With this, ozone is suppressed to be retained and changed into a bubble. As a result, the ozone concentration of electrolyzed water can be increased.

Figure 17:
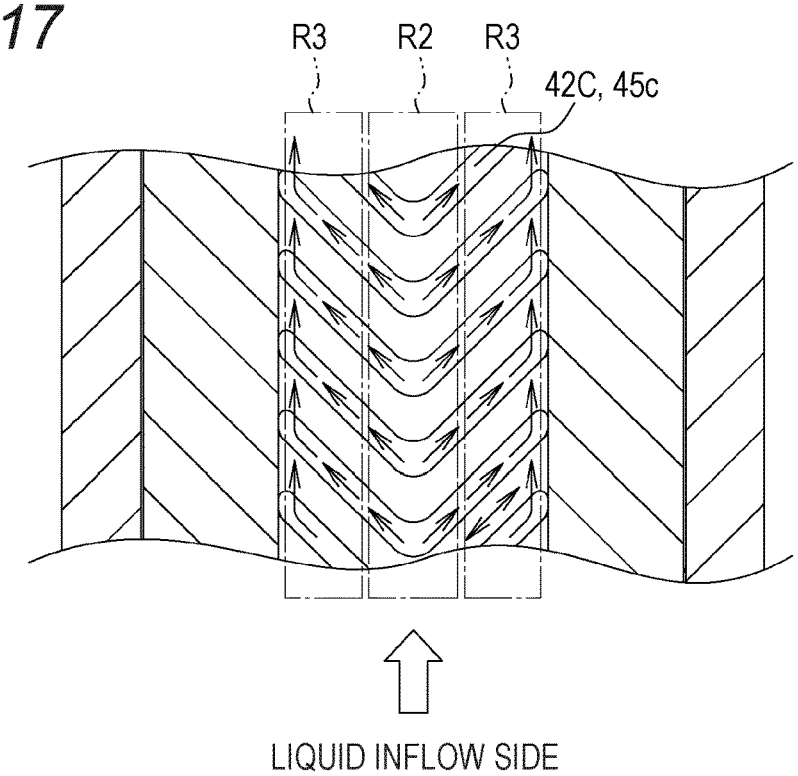
FIG. 17 is a cross-sectional view of the electrolytic liquid generating device illustrating the flow of ozone in the negative electrode side hole of the groove part of the electrode liquid generating device, when seen in the width direction, according to the first exemplary embodiment of the present invention.

Furthermore, groove part 42C shown in FIG. 17 may be adopted. FIG. 17 is a cross-sectional view of electrolytic liquid generating device 1 illustrating the flow of ozone in negative electrode side hole 45c of groove part 42 of electrode liquid generating device 1, when seen in the width direction, according to the first exemplary embodiment of the present invention.

In FIG. 17, negative electrode side hole 45c is formed such that first region R2 in which the flowing speed of water in passage 70 is large is disposed at the downstream side of second region R3 in which the flowing speed is low compared to that in first region R2.

With such a configuration, a part of negative electrode side hole 45c in the longitudinal direction is also disposed to be inclined to the liquid flowing direction (X direction). Accordingly, generated ozone can be moved along the incline of negative electrode side hole 45c (see solid line arrows in FIG. 17). With this, ozone is suppressed to be retained and changed into a bubble. As a result, the ozone concentration of electrolyzed water can be increased.

As described above, ozone water generating device (electrolytic liquid generating device) 1 according to the first exemplary embodiment has electrolytic part 40, which electrolyzes liquid, having laminated body 41 in which conductive film 46 is laminated to be interposed between mutually adjacent electrodes (positive electrode 44 and negative electrode 45). Furthermore, ozone water generating device (electrolytic liquid generating device) 1 has passage 70 having inflow port 71 in which liquid provided to electrolytic part 40 flows and outflow port 72 from which electrolytic liquid generated in electrolytic part 40 flows out, and passage 70 is formed such that the liquid flowing direction (X direction) crosses the laminated direction (Z direction) of laminated body 41. Furthermore, groove part 42 opened to passage 70 is formed in laminated body 41. At least a part of boundary surface 47 between conductive film 46 and the electrodes (positive electrode 44 and negative electrode 45) is exposed to groove part 42. Furthermore, crossing surface 42e crossing orthogonal surface 42h orthogonal to the liquid flowing direction is formed in at least a part of side surface 42d at the downstream side in the liquid flowing direction among side surfaces 42c of groove part 42. Furthermore, crossing surface 42e is formed, when seen in the laminated direction, such that edge 42g at the bottom surface 42b side of groove part 42 in crossing surface 42e is disposed in region R1, which includes boundary line C, defined by edge 42f at opening 42a side of groove part 42.

With this, generated ozone (electrolytic product) is apt to move along crossing surface 42e. Accordingly, ozone (electrolytic product) is suppressed to be retained in groove part 42 and the ozone concentration (electrolytic product concentration) of electrolyzed water (liquid) can be increased.

Furthermore, when crossing surface 42e is seen in the laminated direction, a line depicted by edge 42g at the opening 42a side of groove part 42 in crossing surface 42e is extended in a direction crossing line 42i depicted by orthogonal surface 42h.

With this, generated ozone (electrolytic product) is apt to move along crossing surface 42e from the upstream side toward the downstream side. Accordingly, ozone (electrolytic product) is suppressed to be retained in groove part 42 and the ozone concentration (electrolytic product concentration) of electrolyzed water (liquid) can be increased.

Furthermore, the electrodes adjacent to each other correspond to negative electrode 45 and positive electrode 44. The laminated body is disposed such that passage 70 is formed at the negative electrode 45 side. Groove part 42 has negative electrode side hole 45c formed in negative electrode 45 so as to penetrate in the laminated direction. Negative electrode side hole 45c is disposed such that a part of negative electrode side hole 45c in the longitudinal direction is extended in a direction crossing the liquid flowing direction.

With this, water in groove part 42 is apt to move from the upstream side toward the downstream side. Accordingly, generated ozone (electrolytic product) is also apt to move from the upstream side toward the downstream side. As a result, ozone (electrolytic product) is further suppressed to be retained in groove part 42 and the ozone concentration (electrolytic product concentration) of electrolyzed water (liquid) can be increased.

Furthermore, negative electrode side hole 45c is disposed such that first region R2 in which the flowing speed of liquid in passage 70 is high is located at the downstream side of second region R3 in which the flowing speed is low compared to that in first region R2.

With this, generated ozone (electrolytic product) is moved to first region R2 in which the flowing speed is high along the incline of negative electrode side hole 45c. Accordingly, ozone (electrolytic product) can be further suppressed to be retained. Thus, the ozone concentration (electrolytic product concentration) can be further increased.

Furthermore, crossing surface 42e is formed in negative electrode side hole 45c, and crossing surface 42e is disposed such that an upward direction of crossing surface 42e is defined by a direction from the conductive film 46 side toward the opposite side opposite to the conductive film 46 side in a state in which laminated body 41 is disposed such that the opening 42a side of groove part 42 is to be the upper side.

With this, generated ozone (electrolytic product) is apt to move toward the opening 42a side along an inclined surface of negative electrode side hole 45c. Thus, ozone (electrolytic product) is further suppressed to be retained. Accordingly, the ozone concentration (electrolytic product concentration) can be effectively increased.

Furthermore, conductive film 46 has conductive film side hole 46b formed so as to penetrate in the laminated direction and communicate with negative electrode side hole 45c.

With this, water (liquid) near boundary surface 47 where ozone (electrolytic product) is easily generated can be apt to move, and generated ozone is suppressed to be retained and changed into a bubble. Accordingly, the ozone concentration (electrolytic product concentration) can be more effectively increased.

Second Exemplary Embodiment

Next, an electric apparatus using electrolytic liquid generated by means of an electrolytic liquid generating device and a liquid modifying device provided with an electrolytic liquid generating device are described.

Here, examples of the electric apparatus and the liquid modifying device include a water processing apparatus such as a water filtration device, and a washing machine, a dishwasher, a warm water washing toilet seat, a refrigerator, a hot/cold water supply device, a sterilizing device, a medical apparatus, an air conditioner, and a kitchen apparatus.

In the second exemplary embodiment, the electric apparatus using electrolytic liquid generating device 1 is described.

Figure 20:
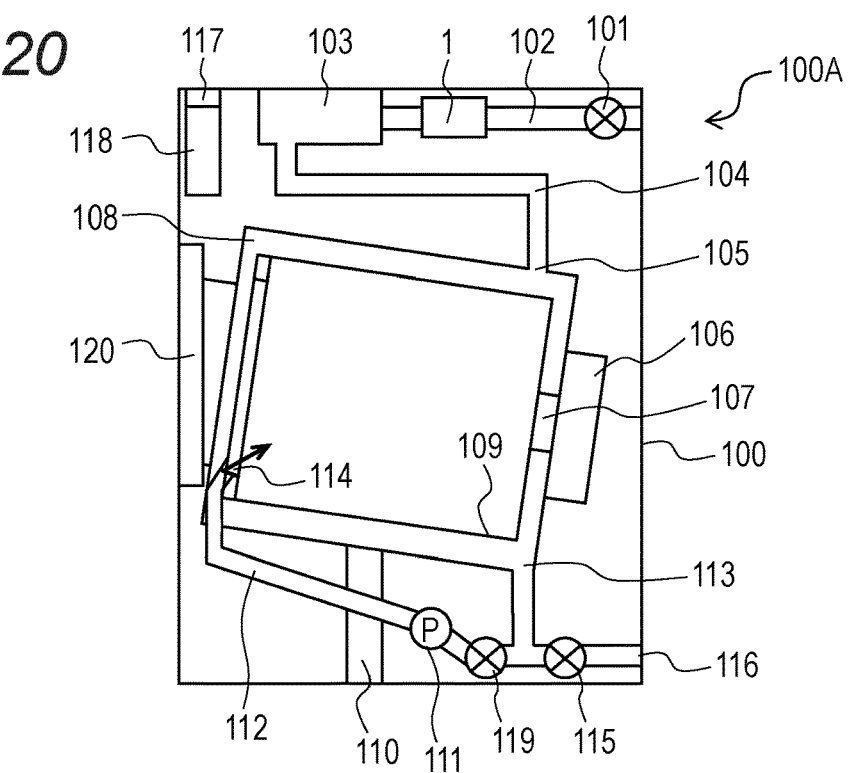
FIG. 20 is a schematic view illustrating an electric apparatus according to a second exemplary embodiment of the present invention.

FIG. 20 is a schematic view of the electric apparatus according to the second exemplary embodiment of the present invention. FIG. 20 illustrates washing machine 100A as one example of the electric apparatus using electrolytic liquid generating device 1.

Washing machine 100A has washing machine body 100. Operation panel 117 operated by a user, and control part 118 which controls operation of washing machine 100A in accordance with operation to operation panel 117 are disposed in washing machine body 100.

Furthermore, water receiving tank 108 is disposed inside washing machine body 100. Washing tank 109 is disposed inside water receiving tank 108. Washing tank 109 is connected to motor 106 and rotation shaft 107 and washing tank 109 is rotatable inside water receiving tank 108. Furthermore, water receiving tank 108 is fixed in washing machine body 100 by supporting column 110. Furthermore, lid 120 is mounted to washing machine body 100 in an openable and closable manner. When lid 120 is opened, an object to be washed can be disposed into washing tank 109 or a washed object can be retrieved from washing tank 109.

Furthermore, water supply pipe 102 and water supply pipe 104, which introduce water such as tap water to water receiving tank 108, are disposed inside washing machine body 100. Water supply pipe 102 is, for example, connected to a domestic tap water piping via a faucet. On the other hand, water supply pipe 104 is connected to water receiving tank 108 via water supply port 105. Furthermore, water supply valve 101, electrolytic liquid generating device 1, and medicine case 103 are disposed between water supply pipe 102 and water supply pipe 104. With this, water suitable for washing is introduced from water supply pipe 104 to water receiving tank 108.

The water introduced to water receiving tank 108 can be circulated by a circulation part. Specifically, circulation pump 111 and circulation valve 119 for circulating water are disposed in circulation pipe 112, and this configuration makes it possible to suck water from circulation water inflow port 113 connected to water receiving tank 108 and to sprinkle water from circulation water outflow port 114. Furthermore, drain part 115 is also disposed in washing machine body 100, and this configuration makes it possible to drain the water introduced to water receiving tank 108 from drain pipe 116 by using drain part 115.

Next, operation and a function of washing machine 100A according to the second exemplary embodiment are described.

At first, when a user operates operation panel 117 and activates washing machine 100A, water supply valve 101 is opened by control part 118 and water is introduced into water receiving tank 108 through water supply pipe 102, water supply pipe 104, and washing water supply port 105. At this time, water (water suitable for washing) in which a medicine solution provided from medicine case 103 is mixed into electrolytic liquid generated by means of electrolytic liquid generating device 1 as needed by means of electrolytic liquid generating device 1 is introduced into water receiving tank 108.

The water introduced into water receiving tank 108 is stored in water receiving tank 108. After water is supplied to water receiving tank 108 to a predetermined water level detected by a detection part not shown, water supply valve 101 is closed.

Then, washing tank 109 disposed inside water receiving tank 108 is rotated in water receiving tank 108 by motor 106, and therefore the object to be washed is washed.

At this time, circulation valve 119 is opened and circulation pump 111 is activated by control part 118. After that, water in water receiving tank 108 is sucked from circulation water inflow port 113 and sprinkled from circulation water outflow port 114 into water receiving tank 108. Here, since lid 120 for closing water receiving tank 118 and washing tank 109 is disposed in washing machine 100A, leaking of water to other part in washing machine body 100 or an outside of washing machine body 100 is suppressed.

Furthermore, after washing, drain part 115 is activated and water in washing tank 109 and water receiving tank 108 is drained from drain pipe 116 to the outside of washing machine body 100.

With such a configuration, not only medicine solution but also water including electrolytic liquid as needed can be introduced into washing tank 109. Accordingly, a washing effect against the object to be washed can be improved. Furthermore, since washing tank 109 is rotated while impregnating the object to be washed with water including electrolytic liquid, the object to be washed can be more effectively washed. As a result, washing time can be shortened and an energy saving can be achieved.

As described above, the electric apparatus according to the present exemplary embodiment uses the electrolytic liquid generated by means of electrolytic liquid generating device 1. With this, washing and sterilization can be effectively performed.

Third Exemplary Embodiment

In a third exemplary embodiment, an electric apparatus using electrolytic liquid generating device 1 is described.

Figure 21:
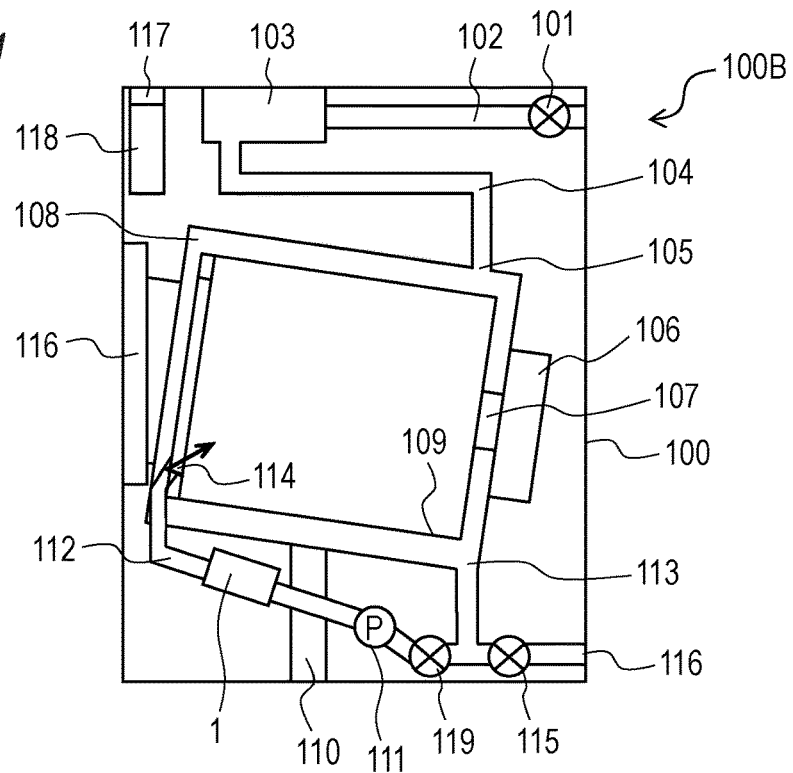
FIG. 21 is a schematic view illustrating an electric apparatus according to a third exemplary embodiment of the present invention.

FIG. 21 is a schematic view of the electric apparatus according to the third exemplary embodiment of the present invention. FIG. 21 illustrates washing machine 100B as one example of the electric apparatus using electrolytic liquid generating device 1. Basically, washing machine 100B has a similar configuration to washing machine 100A according to the second exemplary embodiment described above. Accordingly, only components different from those in the second exemplary embodiment are described below, and therefore description of components and advantageous effects similar to those in the second exemplary embodiment are omitted.

In washing machine 100B according to the third exemplary embodiment, electrolytic liquid generating device 1 is disposed in a middle of circulation pipe 112, and this configuration is mainly different from washing machine 100A according to the second exemplary embodiment described above.

With such a configuration, a function and an effect similar to those in washing machine 100A according to the second exemplary embodiment described above can be obtained.

Furthermore, by disposing electrolytic liquid generating device 1 in the middle of circulation pipe 112, a solution for washing circulated during washing can be changed into an electrolytic solution. Accordingly, a washing effect against the object to be washed can be further improved.

Fourth Exemplary Embodiment

In a fourth exemplary embodiment, an electric apparatus using electrolytic liquid generating device 1 is described.

Figure 22:
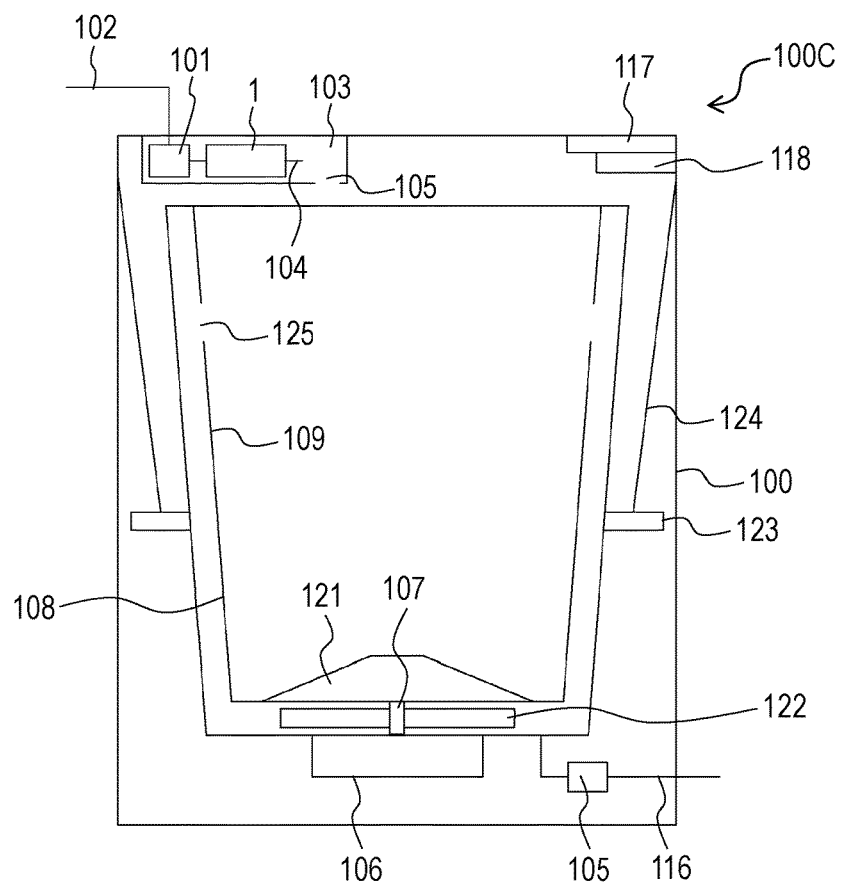
FIG. 22 illustrates an electric apparatus according to a fourth exemplary embodiment of the present invention.

FIG. 22 is a schematic view of the electric apparatus according to the fourth exemplary embodiment of the present invention. FIG. 22 illustrates washing machine 100C as one example of the electric apparatus using electrolytic liquid generating device 1. Basically, washing machine 100C has a similar configuration to washing machine 100A according to the second exemplary embodiment described above. Accordingly, only components different from those in the second exemplary embodiment are described below, and therefore description of components and advantageous effects similar to those in the second exemplary embodiment are omitted.

In washing machine 100C according to the fourth exemplary embodiment, water receiving tank 108 is disposed inside washing machine body 100 by means of water receiving tank supporting part 123 and water receiving tank supporting part 124, and this configuration is mainly different from washing machine 100A according to the second exemplary embodiment described above.

Furthermore, in washing machine 100C, washing tank 109 is disposed inside water receiving tank 108. A configuration in which washing tank 109 is connected to motor 106 and rotation shaft 107 is the same as that of washing machine 100A. However, rotor blade 121, which is rotatable inside washing tank 109, is disposed in washing machine 100C.

Furthermore, pumping blade 122 fixed to rotation shaft 107 is disposed between water receiving tank 108 and washing tank 109. Pumping blade 122 is rotated together with rotation of motor 106. By disposing pumping blade 122, in addition to agitating a solution inside washing tank 109 by means of rotor blade 121, water can be circulated by pumping the water toward between water receiving tank 108 and washing tank 109 by means of pumping blade 122 and by sprinkling the water from washing tank opening part 125 disposed at an upper part.

Furthermore, in washing machine 100C, electrolytic liquid generating device 1 is disposed between water supply pipe 102 and water supply pipe 104 similar to washing machine 100A.

With such a configuration, not only the object to be washed can be physically washed, but also the object to be washed can be chemically washed by using generated electrolytic solution. Accordingly, a washing effect can be further improved.

Fifth Exemplary Embodiment

In a fifth exemplary embodiment, an electric apparatus using electrolytic liquid generating device 1 is described.

Figure 23:
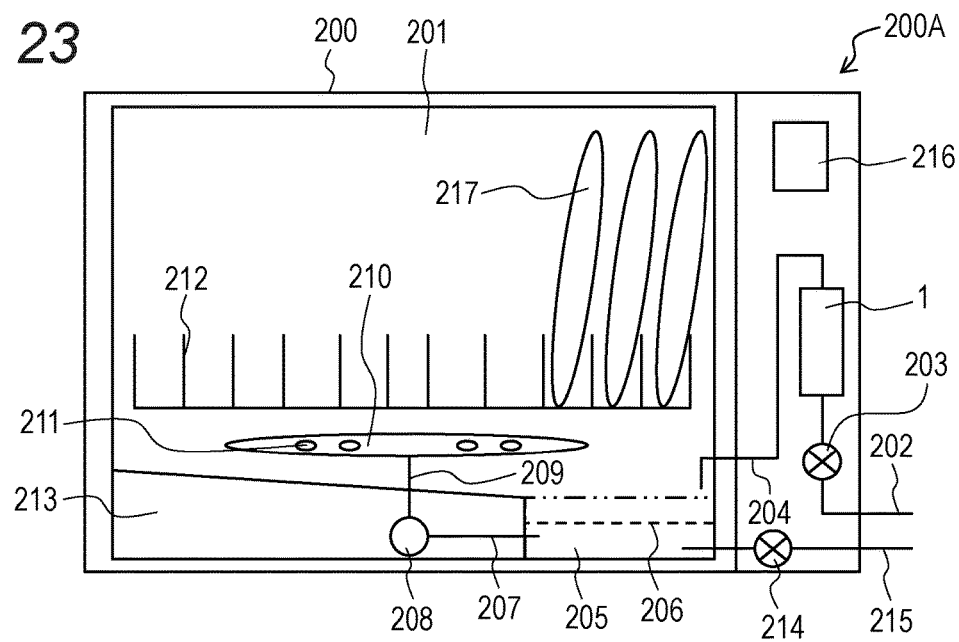
FIG. 23 is a schematic view illustrating an electric apparatus according to a fifth exemplary embodiment of the present invention.

FIG. 23 is a schematic view of the electric apparatus according to the fifth exemplary embodiment of the present invention. FIG. 23 illustrates dishwasher 200A as one example of the electric apparatus using electrolytic liquid generating device 1.

Dishwasher 200A has dishwasher body 200. Operation part 216 which controls operation of dishwasher 200A in accordance with operation of a user is disposed in dishwasher body 200.

Furthermore, dish housing part 201 is disposed inside dishwasher body 200. Dish fixing part 212 for arranging dish to be washed (object to be washed) 217 is disposed inside dish housing part 201.

Furthermore, water storage part 205 is disposed inside dishwasher body 200. Mesh 206 is disposed inside water storage part 205.

Furthermore, water supply pipe 202 and water supply pipe 204, which introduce water such as tap water to water storage part 205, are disposed inside dishwasher body 200. Water supply pipe 202 is, for example, connected to a domestic tap water piping via a faucet. On the other hand, water supply pipe 204 serves as a pipe for introducing water, which is introduced to water supply pipe 202, to water storage part 205. Furthermore, water supply valve 203 and electrolytic liquid generating device 1 are disposed between water supply pipe 202 and water supply pipe 204, and therefore water suitable for washing can be introduced from water supply pipe 204 into water storage part 205.

Circulation pipe 207, which introduces water in water storage part 205 into water sprinkling pipe 209 connected to water sprinkling part 210, is disposed below mesh 206 in water storage part 205. Here, water sprinkling part 210 is formed to be hollow. Injection port 211 is disposed at one or more portions on water sprinkling part 210. Water sprinkling part 210 is disposed to be rotatable against water sprinkling pipe 209.

Water introduced to water storage part 205 can be circulated by the circulation part. Specifically, circulation pipe 207 and circulation pump 208 for circulating water are disposed in device storage part 213. Water is sucked from circulation pipe 207 connected to water storage part 205 and sprinkled from injection port 211 of water sprinkling part 210. Furthermore, drain part 214 is also disposed in dishwasher body 200. Water introduced to water storage part 205 can be drained from drain pipe 215 by means of drain part 214.

Next, operation and a function of dishwasher 200A according to the fifth exemplary embodiment are described.

At first, when a user operates operation part 216 and activates dishwasher 200A, water supply valve 203 is opened by control part 216 and water is introduced into water storage part 205 through water supply pipe 202, and water supply pipe 204. At this time, electrolytic liquid (water suitable for washing), which is generated by electrolytic liquid generating device 1, is introduced into water storage part 205 and then electrolytic liquid is stored. After water is supplied to a predetermined water level detected by a detection part not shown, water supply valve 203 is closed.

Then, by activating circulation pump 208, water in water storage part 205 is sent to circulation pump 208 from circulation pipe 207 and introduced to water sprinkling part 210 via water sprinkling pipe 209. After that, water is sprinkled into dish storage part 201 from injection port 211 of water sprinkling part 210, and dish (object to be washed) 217 disposed on dish fixing part 212 is washed. At this time, water sprinkling pipe 209 is rotated by reaction force generated when water provided by circulation pump 208 is sprinkled from injection port 211. Thus, water (washing liquid) can be equally sprinkled to dish (object to be washed) 217 inside dish storage part 201 and dish (object to be washed) 217 can be more effectively washed. Sprinkled water is returned to water storage part 205 disposed at a lower part in dish storage part 201 while washing the dish, and water is sent again to water sprinkling part 210 by circulation pump 208. In this way, dish (object to be washed) 217 is repeatedly washed. Here, water sprinkled into dish storage part 201 is returned to water storage part 205 with a solid adhering article adhering on dish (object to be washed) 217 being caught by mesh 206.

After washing, drain part 214 is activated and water in water storage part 205 is drained from drain pipe 215 to an outside of dishwasher body 200.

With such a configuration, water including electrolytic liquid as needed can be sprinkled to dish (object to be washed) 217 disposed inside dish storage part 201. Accordingly, a washing effect against dish (object to be washed) 217 can be further improved. As a result, washing time can be shortened and an energy saving can be achieved.

Here, water in which a medicine solution is mixed into electrolytic liquid generated by means of electrolytic liquid generating device 1 as needed may be used as washing water.

Sixth Exemplary Embodiment

In a sixth exemplary embodiment, an electric apparatus using electrolytic liquid generating device 1 is described.

Figure 24:
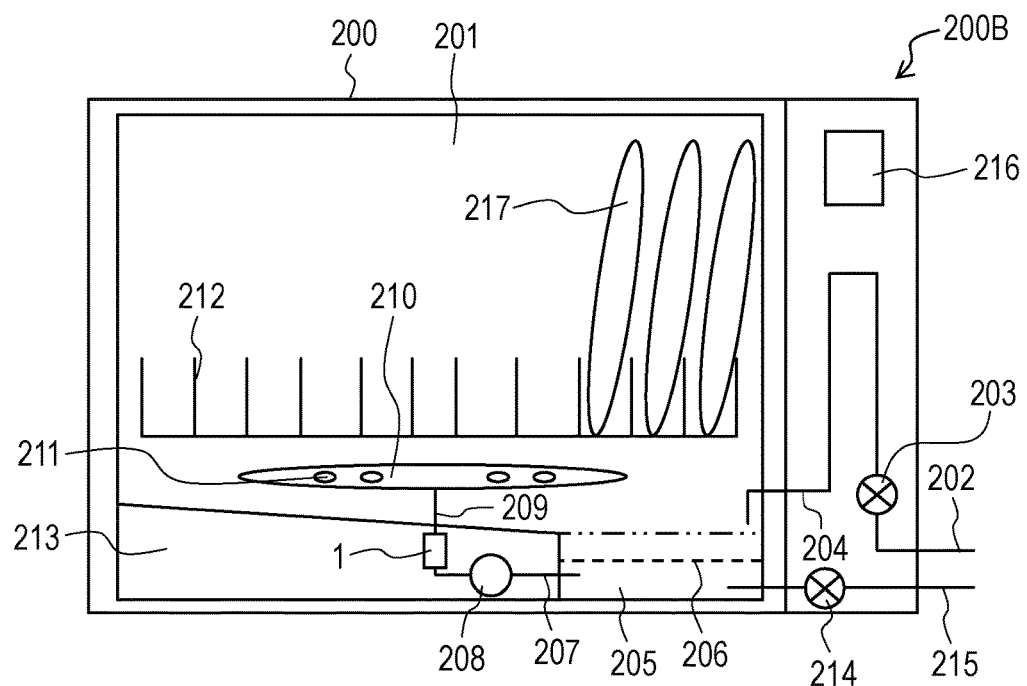
FIG. 24 is a schematic view illustrating an electric apparatus according to a sixth exemplary embodiment of the present invention.

FIG. 24 is a schematic view of the electric apparatus according to the sixth exemplary embodiment of the present invention. FIG. 24 illustrates dishwasher 200B as one example of the electric apparatus using electrolytic liquid generating device 1. Basically, dishwasher 200B has a similar configuration to dishwasher 200A according to the fifth exemplary embodiment described above. Accordingly, only components different from those in the fifth exemplary embodiment are described below, and therefore description of components and advantageous effects similar to those in the fifth exemplary embodiment are omitted.

In dishwasher 200B according to the sixth exemplary embodiment, electrolytic liquid generating device 1 is disposed in a middle of water sprinkling pipe 209 which is a latter part (downstream side) of circular pump 208, and this configuration is mainly different from dishwasher 200A according to the fifth exemplary embodiment described above.

With such a configuration, a function and an effect similar to those in dishwasher 200A according to the fifth exemplary embodiment described above can be obtained.

Furthermore, by disposing electrolytic liquid generating device 1 in the middle of water sprinkling pipe 209 which is the latter part (downstream side) of circulation pump 208, water suitable for washing can be generated at a part proximal to dish (object to be washed) 217. As a result, water including an electrolytic solution can be sprinkled to dish (object to be washed) 217 in a high concentration state, and therefore washing and sterilization can be more effectively performed. Furthermore, washing time can be shortened and an energy saving can be achieved.

Seventh Exemplary Embodiment

In a seventh exemplary embodiment, a liquid modifying device provided with electrolytic liquid generating device 1 is described.

Figure 25:
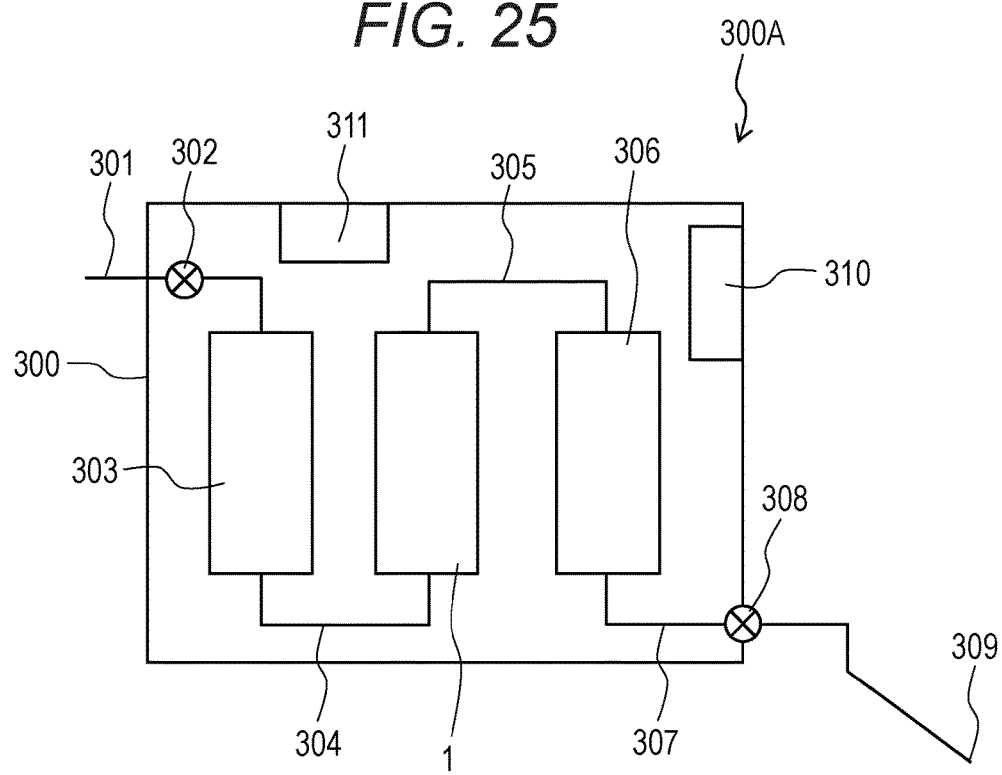
FIG. 25 is a schematic view illustrating a liquid modifying device according to a seventh exemplary embodiment of the present invention.

FIG. 25 is a schematic view of the liquid modifying device according to the seventh exemplary embodiment of the present invention. FIG. 25 illustrates water purifier 300A as one example of the liquid modifying device provided with electrolytic liquid generating device 1.

Water purifier 300A has water purifier body 300. Operation panel 310 operated by a user, and control part 311 which controls operation of water purifier 300A in accordance with operation to operation panel 310 are disposed in water purifier body 300.

Furthermore, filter 303, electrolytic liquid generating device 1, and decomposition part 306 are disposed inside water purifier body 300.

Water supply pipe 301, which introduces water such as tap water to filter 303, is disposed at an upstream side of filter 303. Water supply pipe 301 is, for example, connected to a domestic tap water piping via a faucet. Water supply valve 302 is disposed in a middle of water supply pipe 301.

A downstream side of filter 303 is connected to an upstream side of electrolytic liquid generating device 1 via connecting pipe 304. A downstream side of electrolytic liquid generating device 1 is connected to an upstream side of decomposition part 306 via connecting pipe 305. Connecting pipe 307 is connected to a downstream side of decomposition part 306. Discharging valve 308 is disposed in a middle of connecting pipe 307. Discharging port 309 is formed at a distal end of connecting pipe 307. Purified water is discharged from discharging port 309 to an outside.

Next, operation and a function of water purifier 300A according to the seventh exemplary embodiment are described.

At first, when a user operates operation panel 310 and activates water purifier 300A, water supply valve 302 is opened by control part 311 and water is introduced into filter 303 through water supply pipe 301 by water line pressure.

The water introduced into filter 303 passes through filter 303, and impurities such as rust and dust are removed.

The water from which impurities are removed is introduced to electrolytic liquid generating device 1 through connecting pipe 304.

At this time, by energizing electrolytic liquid generating device 1 by means of control part 311, the water passing through electrolytic liquid generated device 1 is electrolyzed and changed into an electrolytic solution, and therefore sterilization of water is performed.

The sterilized water is introduced to decomposition part 306 through connecting part 305 and the electrolytic solution is decomposed and adjusted into water suitable for drinking. Examples of decomposition part 306 include, but not limited to, a filter medium such as activated carbon or zeolite, and physical means or chemical means capable of decomposing water.

Furthermore, drinkable water (purified water: modified water) can be discharged from discharging port 309 to the outside of the water purifier.

With such a configuration, not only removal of impurities in water but also sterilization of water is performed. Accordingly, safer water can be discharged and sanitary water can be provided to a user.

Preferable exemplary embodiments of the present invention are described above; however the present invention is not limited to the exemplary embodiments described above, and various modifications can be adopted.

For example, in the first exemplary embodiment, the ozone water generating device, which generates ozone water by generating ozone and dissolving the ozone into water, is described as an example. However, an object to be generated is not limited to ozone, namely for example, hypochlorous acid may be generated to use for sterilization or a water processing. Furthermore, the device may generate oxygen water, hydrogen water, chlorine containing water, hydrogen peroxide water or the like.

Furthermore, positive electrode 44 may be formed of, for example, conductive silicon, conductive diamond, titanium, platinum, lead oxide, or tantalum oxide. Accordingly, any material having conductivity and durability capable of generating electrolytic water may be used for the electrode. Furthermore, in a case in which positive electrode 44 is formed of diamond, a manufacturing method is not limited to a method of film forming. Furthermore, any materials other than metal material may be used for a substrate.

Furthermore, negative electrode 45 may be formed of, for example, platinum, titanium, stainless, or conductive silicon as long as having conductivity and durability.

Furthermore, the washing machine, the dishwasher, and the water purifier are not limited to those described in the second to the sixth exemplary embodiments, and various configurations may be adopted.

The electrolytic liquid generating device may be formed in various configurations. Such an electrolytic liquid generating device can be applied in the electric apparatus using the electrolytic liquid generated by means of the electrolytic liquid generating device and the liquid modifying device provided with the electrolytic liquid generating device.

With this, the liquid modifying device and the electric apparatus capable of effectively performing the washing and the sterilization can be provided.

Furthermore, the housing, the electrolytic electrode device, and other configurations (shape, size, layout, or the like) may be modified as needed.

As described above, the liquid modifying device according to the present exemplary embodiment comprises electrolytic liquid generating device 1. With this, the washing and the sterilization can be effectively performed.

INDUSTRIAL APPLICABILITY

As described above, the electrolytic liquid generating device according to the present invention can increase the electrolytic product concentration in electrolyzed liquid. Accordingly, the present invention can be adopted, for example, in a water processing apparatus such as a water filtration device, and a washing machine, a dishwasher, a warm water washing toilet seat, a refrigerator, a hot/cold water supply device, a sterilizing device, a medical apparatus, an air conditioner, and a kitchen apparatus.

The invention claimed is:

1. An electrolytic liquid generating device comprising:
an electrolytic part having a laminated body in which a conductive film is laminated to be interposed between a first electrode and a second electrode, the first and second electrodes and the conductive film being stacked along a laminated direction, the electrolytic part being configured to electrolyze liquid; and
a passage having an inflow port in which liquid to be provided to the electrolytic part flows and an outflow port from which electrolytic liquid generated in the electrolytic part flows out, the passage being formed such that a liquid flowing direction is perpendicular to the laminated direction of the laminated body, wherein:
a groove part opened to the passage is formed in the laminated body, the groove part passing through the conductive film and the first electrode,
a bottom of the groove part is formed by the second electrode,
a flat surface, which crosses the liquid flow direction and a surface that is orthogonal to the liquid flowing direction and parallel to the laminated direction in plan view when viewed from above the laminated body along the laminated direction, is formed on at least a part of a side surface of the groove part located at a downstream side in the liquid flowing direction among side surfaces of the groove part, at least a part of the groove part in a longitudinal direction is disposed to extend in a direction crossing a longitudinal direction of the laminated body, the longitudinal direction of the laminated body being parallel to the liquid flowing direction, and the flat surface is a surface of the groove part on the downstream side and the flat surface is formed by inclining an edge at an opening side of the groove part toward the downstream side.

2. The electrolytic liquid generating device according to claim 1, wherein:

the first electrode is a negative electrode and the second electrode is a positive electrode, and the laminated body is disposed such that the passage is formed at a negative electrode side.

3. A liquid modifying device comprising the electrolytic liquid generating device according to claim 1.

4. An electric apparatus using electrolytic liquid generated by means of the electrolytic liquid generating device according to claim 1.

5. The electrolytic liquid generating device according to claim 1, wherein an area of the groove part at a surface of the first electrode is equal to or greater than an area of the bottom of the groove part.

6. The electrolytic liquid generating device according to claim 1, wherein the side surface of the groove part located at the downstream side is inclined with respect to the surface orthogonal to the liquid flowing direction.

7. The electrolytic liquid generating device according to claim 6, wherein a side surface of the groove part located at an upstream side in the liquid flowing direction among the side surfaces of the groove part is parallel to the surface orthogonal to the liquid flowing direction.

8. An electrolytic liquid generating device comprising:

an electrolytic part having a laminated body in which a conductive film is laminated to be interposed between a first electrode and a second electrode, the first and second electrodes and the conductive film being stacked along a laminated direction, the electrolytic part being configured to electrolyze liquid, and a passage having an inflow port in which liquid to be provided to the electrolytic part flows and an outflow port from which electrolytic liquid generated in the electrolytic part flows out, the passage being formed such that a liquid flowing direction is perpendicular to the laminated direction of the laminated body, wherein:

a groove part opened to the passage is formed in the laminated body, the groove part passing through the conductive film and the first electrode, a bottom of the groove part is formed by the second electrode, a flat surface, which crosses the liquid flow direction and a surface that is orthogonal to the liquid flowing direction, is formed on at least a part of a side surface of the groove part located at a downstream side in the liquid flowing direction among side surfaces of the groove part, and the groove part has a V-shape having a bent portion and two straight portions extending from the bent portion.

9. The electrolytic liquid generating device according to claim 8, wherein the bent portion is located at the downstream side than the straight portions.

10. The electrolytic liquid generating device according to claim 8, wherein the bent portion is located at an upstream side than the straight portions.

11. The electrolytic liquid generating device according to claim 8, wherein the bent portion is located at a first region and the straight portions are located at a second region where the flowing speed of the liquid is lower than a flowing speed of the liquid in the first region.

12. The electrolytic liquid generating device according to claim 8, wherein the bent portion includes two bending portions.

13. An electrolytic liquid generating device comprising:

an electrolytic part having a laminated body in which a conductive film is laminated to be interposed between a first electrode and a second electrode, the first and second electrodes and the conductive film being stacked along a laminated direction, the electrolytic part being configured to electrolyze liquid, and a passage having an inflow port in which liquid to be provided to the electrolytic part flows and an outflow port from which electrolytic liquid generated in the electrolytic part flows out, the passage being formed such that a liquid flowing direction is perpendicular to the laminated direction of the laminated body, wherein:

a groove part opened to the passage is formed in the laminated body, the groove part passing through the conductive film and the first electrode, a bottom of the groove part is formed by the second electrode, a flat surface, which crosses the liquid flow direction and a surface that is orthogonal to the liquid flowing direction, is formed on at least a part of a side surface of the groove part located at a downstream side in the liquid flowing direction among side surfaces of the groove part, a plurality of groove parts are provided, each of the plurality of groove parts has a V-shape having a bent portion and two straight portions extending from the bent portion, and the plurality of groove portions are aligned in the liquid flowing direction.

14. The electrolytic liquid generating device according to claim 13, wherein the bent portion is located at the downstream side than the straight portions.

15. The electrolytic liquid generating device according to claim 13, wherein the bent portion is located at an upstream side than the straight portions.

16. The electrolytic liquid generating device according to claim 13, wherein the bent portion is located at a first region and the straight portions are located at a second region where the flowing speed of the liquid is lower than a flowing speed of the liquid in the first region.

17. The electrolytic liquid generating device according to claim 13, wherein the bent portion includes two bending portions.

* * * * *